United States Patent
Reses et al.

(10) Patent No.: US 10,990,980 B1
(45) Date of Patent: Apr. 27, 2021

(54) PREDICTING CAPITAL NEEDS

(71) Applicant: Square, Inc., San Francisco, CA (US)

(72) Inventors: Jacqueline Reses, Woodside, CA (US); Audrey Kim, San Francisco, CA (US); Theodore Kosev, Seattle, WA (US); Andy Montgomery, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/526,888

(22) Filed: Jul. 30, 2019

Related U.S. Application Data

(60) Provisional application No. 62/865,595, filed on Jun. 24, 2019.

(51) Int. Cl.
*G06Q 20/40* (2012.01)
*G06Q 40/00* (2012.01)
*G06Q 40/02* (2012.01)

(52) U.S. Cl.
CPC ......... *G06Q 20/405* (2013.01); *G06Q 40/025* (2013.01); *G06Q 40/12* (2013.12)

(58) Field of Classification Search
CPC ..... G06Q 20/405; G06Q 40/12; G06Q 40/025
See application file for complete search history.

(56) References Cited

U.S. PATENT DOCUMENTS

| | | | |
|---|---|---|---|
| 6,490,568 B1 | 12/2002 | O'Mara et al. | |
| 10,275,613 B1 | 4/2019 | Olenoski et al. | |
| 2003/0182230 A1 | 9/2003 | Pessin | |
| 2007/0118449 A1 | 5/2007 | De La Motte | |
| 2012/0078813 A1 | 3/2012 | Rose et al. | |
| 2013/0138563 A1 | 5/2013 | Gilder et al. | |
| 2014/0344128 A1* | 11/2014 | Nikankin | G06Q 40/00 705/35 |
| 2017/0126581 A1 | 5/2017 | Wadley et al. | |
| 2017/0236581 A1 | 8/2017 | Yang et al. | |

(Continued)

FOREIGN PATENT DOCUMENTS

CN 107025526 A 8/2017

OTHER PUBLICATIONS

Investopedia, http://www.investopedia.com/terms/s/sweepaccount.asp, Oct. 2017 (Year: 2017).*

(Continued)

*Primary Examiner* — Florian M Zeender
*Assistant Examiner* — Joseph M Mutschler
(74) *Attorney, Agent, or Firm* — Lee & Hayes, P.C.

(57) ABSTRACT

This disclosure describes, in part, techniques for generating predictive models based on past transaction data and/or future-event data to predict: (i) when an account of user is expected to fall below a minimum balance associated with that user, and/or (ii) when an account has surplus funds that may safely be moved to a higher-yield account for some amount of time. In response to determining a predicted time at which an account is expected to fall below the minimum balance, the techniques may generate an offer to extend capital to the user prior to the predicted time. In response to determining that a user has or will have surplus funds, the techniques may generate an offer to move some or all of these surplus funds into a separate account providing a higher yield than the primary account of the user.

20 Claims, 28 Drawing Sheets

(56) References Cited

U.S. PATENT DOCUMENTS

2017/0344945 A1    11/2017  Hennessy et al.
2018/0060843 A1*    3/2018  Maheshwari ...... G06Q 20/3224

OTHER PUBLICATIONS

Non-Final Office Action dated Dec. 11, 2019, for U.S. Appl. No. 16/526,906, of Jacqueline et al., filed Jul. 30, 2019.
Final Office Action dated Mar. 25, 2020, for U.S. Appl. No. 16/526,906, of Reses, J., et al., filed Jul. 30, 2019.
Advisory Action dated Jun. 5, 2020, for U.S. Appl. No. 16/526,906, of Reses, J., et al., filed Jul. 30, 2019.
Non-Final Office Action dated Jul. 23, 2020, for U.S. Appl. No. 16/526,906, of Reses, J., et al., filed Jul. 30, 2019.
Ong, Michael K. "Internal Credit Risk Models: Capital Allocation and Performance Measurement", Risk Books, a specialist division of Risk Publications, pp. 1-343 (Year 1999).
Notice of Allowance dated Feb. 18, 2021, for U.S. Appl. No. 16/526,906, of Reses, J., et al., filed Jul. 30, 2019.

* cited by examiner

PREDICTING CAPITAL NEEDS

RELATED APPLICATIONS

This application claims priority to U.S. Provisional Patent Application No. 62/865,595, filed on Jun. 24, 2019, of which is incorporated herein by reference.

BACKGROUND

In some instances, the nature of merchant businesses results in varying merchant-account balances over the course of a year or other time period. For example, one merchant may be relatively busy during the summer season and relatively slow during the winter season, while another merchant may be busy during the winter but not the summer. Therefore, each merchant may experience varying times of capital need, as well as times of having more capital than needed to carry out their respective business operations. Similarly, non-merchant users may experience varying cash flows, due to the periodic nature of expenses and income.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

FIG. 24 illustrates an example UI after the user has selected the icon of FIG. 23 to take action with respect to the predicted surplus funds. As illustrated, the UI may enable the user to perform actions such as save for an unexpected expense, prepare for taxes, or the like.

DETAILED DESCRIPTION

Figure 1A:
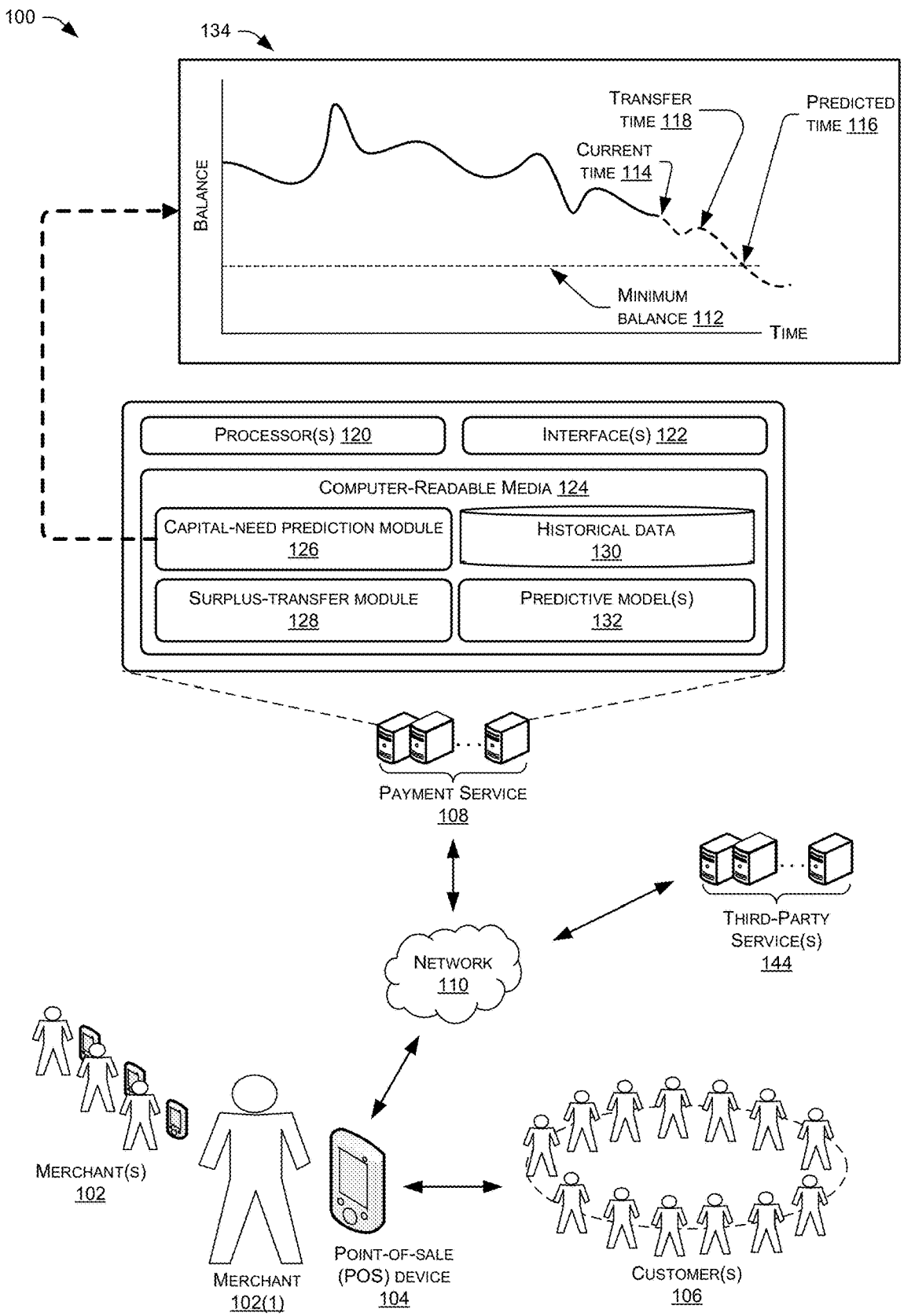
FIG. 1A illustrates an example environment in which a payment service is able to predict a time at which a balance of a particular merchant account is expected to dip below a minimum balance for that merchant and, in response, facilitate transfer of loaned funds into the merchant account.

As described above, respective balances of merchant or other user accounts often vary throughout the year and throughout other time periods based on an array of factors, such a seasonality of a respective merchant's business, the presence (or lack thereof) of events local to the respective merchant, the fluctuation of payments made to or from the merchant to vendors or suppliers, varying cashflow needs of users, changing financial or economic landscape, and/or the like. As such, at certain times an example merchant or other user may have need for capital, while in other instances the example merchant or other user may have too much capital residing in a merchant account that is used primarily for operating the business of the merchant or a household of the user. Furthermore, merchants and other users may find it difficult to predict when capital will be needed and when surplus funds may be safely transferred to a different account. All of the above may result in a merchant or user having too little funds in their account, borrowing too much to avoid that scenario, failing to adequately monetize surplus funds when they exist, and the like.

This disclosure describes, in part, techniques for generating predictive models based on past transaction data and/or future-event data to predict: (i) when a merchant or user account is expected to dip below a minimum balance associated with that merchant or user, and/or (ii) when a merchant or user account has surplus funds that may safely be moved to a higher-yielding account for some amount of time. In some instances, the described techniques may also determine, in response to identifying an account balance is expected to dip below a minimum balance, an amount and timing for providing additional funds to the account and/or whether one or more expenses coming due may be moved to a later date (e.g., until after an expected receipt of funds in the account, etc.).

First, the techniques may generate one or more predictive models for determining when an example merchant or user is expected to experience need for capital. To do so, the techniques may begin by aggregating historical data associated with an example merchant or user, historical data associated with similarly situated merchants or users, and/or the like. For example, the techniques may aggregate historical transaction data indicating payments into a merchant account and payments out of the merchant account over time, payments into and out of a personal account of a user, and/or the like. The historical transaction data may indicate, for instance, payments made by customers into the merchant account, payments made by the merchant to vendors or suppliers, payments made by a user to a merchant or another user, and/or any other type of movement of funds into and/or out of the merchant or user account. The historical transaction data may also indicate data, such as transaction data, cash flow data, and payment data, from similar merchants (similar merchant type, merchant in similar locations, and so on). In addition, the techniques may aggregate historical account-balance information indicating a balance of the merchant or user account as the balance has varied over time. That is, the historical account-balance information may indicate how the balance of the merchant or user account (or accounts) has fluctuated over the course of days, weeks, months, seasons, years, or the like. In some information, this information may indicate seasons or events that affect the business of the merchant or seasons or events that affect cash flow and/or a balance of a user account. In some implementations, the information may be filtered in a variety of ways, e.g., the cash flow can indicate the historical data and/or minimum balance for a specific item, use-case, merchant location, and so on.

In some instances, the techniques described herein may be used to determine a minimum balance that the merchant or user account is to maintain. For example, the minimum balance may be determined by analyzing the historical transaction data to determine the size and timing of payments made into and out of the account and determining a balance that the account should keep to ensure that any reasonably anticipated payment out of the account would not cause disruption to the business of the merchant or to cash-flow needs of a user. In some instances, the minimum balance may change over the course of a year or other time periods, while in other instances it may remain constant. Further, in some instances the minimum balance may be determined using one or more of the predictive models described below. In addition, it is noted that a minimum balance may be unique to a merchant or user or may be unique to a category of merchants or users. Further, in some instances a merchant or user may set the minimum balance for the corresponding account. In some instances, predicting when a merchant account may fall below the minimum balance may comprise predicting when the merchant account may fall below the minimum balance for a threshold amount of time. For example, the techniques might not trigger a capital offer unless the balance is predicted to fall below the minimum balance for at least one hour, at the close of a business day, and/or the like. In some examples, the minimum balance may be set for a specific use case, item, merchant location, and so on.

In some instances, the techniques described herein may also identify similarly situated merchants or users as the example merchant or user and may aggregate the described historical data for these similar merchants. In instances of merchants, the similar merchants may include merchants having a similar business (e.g., the same or a similar merchant category code (MCC)), merchants within a threshold geographic proximity to the example merchant, merchants having a similar sales volume as the example merchant, and/or the like. In terms of users, the similar users may include those users associated with similar demographic data, those users with similar historical data indicating inflow and outflow of funds from their accounts, and/or the like.

After aggregating this historical data associated with the example merchant/user and/or the similar merchants/users, the techniques may train one or more predictive models using the historical data. The predictive models may comprise neural networks, support vector machines, and/or any other type of trained classifier. In some instances, after generating the model, the model may be used to determine whether the merchant account is predicted to dip below the minimum balance and, if so, a time at which the account is predicted to do so.

In response to identifying a time at which the account is predicted to dip below the minimum balance, the techniques may generate an offer to extend capital to the merchant or user, with the offer including loan details such as an amount of the loaned funds, a term of the loan, repayment conditions or the like. As used herein, capital extended to a merchant or other user may include a traditional loan, a business loan, a revolving loan (e.g., secured line of credit, unsecured line of credit, etc.), and/or any other type of loan-based product. In some instances, the offer may indicate the time at which the account is predicted to dip below the minimum balance and may indicate that the loaned funds are being offered to be deposited into the merchant or user account at or prior to this predicted time. If the merchant or user indicates (e.g., via a POS device, other device of a merchant or user) that they accept the offer, then the techniques may facilitate transfer of the loaned funds to the designated account prior to the predicted time, such that the account does not in fact dip below the minimum balance (absent exigent circumstances). In some cases, the minimum balance may be set on a per-item or per merchant location basis. For example, the techniques may, for a specific merchant, dynamically predict and set the balance to be "x" dollars for items deemed to be "inventory" type ("tier 1"), and "y" dollars for items deemed to be "décor" type ("tier 2"). Further, the techniques may define a priority level to these tiers, such that tier 1 items receive a capital offer prior to tier 2 items.

Furthermore, in some instances, the techniques may generate an offer to extend capital in response to one or more triggers other than a prediction that the account balance is going to dip below a minimum balance. For example, the techniques may generate an offer to extend capital in response to a balance differing by a threshold amount (up or down) from a threshold balance, in response to a sudden inflow or outflow of cash, or the like. For example, envision that a first merchant receives a relatively large influx of cash as a down payment for an inventory purchase. The techniques may generate an offer of capital for the merchant in response to this inflow of cash, given that the techniques may determine that the merchant is likely to need additional capital to fulfill the relatively large inventory order. Furthermore, in some instances the merchant may pay back the loaned funds over a predefined payment schedule. In some instances, a portion of each payment transaction processed by the payment service may be withheld by the payment service (with the consent of the merchant) to pay back the loaned funds amount until paid in full (or until a predefined amount has been paid).

In some instances, the loaned funds originate from an account maintained by a payment service that processes payments for the example merchant/user and for other merchants/users. In these instances, the loaned funds may originate from an account of the payment service into which the example merchant or user and other merchants or users may, at times, transfer surplus funds. That is, while the above example describes a scenario where the example merchant or user was determined, via the predictive model(s), to be in need of capital to avoid dipping below the minimum threshold, in other instances the example merchant/user and/or other merchants/users that interact with the payment service may be determined to have surplus funds. In these instances, the merchants or users may choose to transfer some or all of these surplus funds into this pooled account, funds from which may be transferred to merchants in need of capital. Thus, the techniques describe an ecosystem where merchants or users are able to both receive loaned funds in times of need and provide surplus funds for use by other merchants or users in times of plenty.

In order to determine the existence of surplus funds, the techniques described below may determine, for each example merchant or user, a balance of an account over which funds in the account are deemed surplus. That is, the techniques may determine a balance over which the funds in the account are not predicted to be needed to operate the business of the example merchant or needs of a user for at least a threshold amount of time (e.g., one day, one week, one month, etc.). In some instances, this balance may comprise the minimum balance plus an additional amount (e.g., twice the minimum balance, the minimum balance plus a largest payment out of the account in the past year, etc.). In some instances, this defined balance may be set by the merchant or user and/or may be determined based at least in part on a level of risk desired by the merchant or user. For example, the techniques may set a relatively high balance if the merchant indicates a relatively low desire for risk, and vice versa.

Further, when the techniques determine that a balance of a primary account of a merchant or user is over this amount, the techniques may generate an offer for the example merchant offering to transfer some or all of the surplus funds to a secondary account that is separate from the merchant account. In some instances, the techniques may indicate that the separate or secondary account has a yield different from the yield provided by the primary account of the merchant or user, thus providing a potential benefit to the merchant or user. Further, the separate account may comprise the account of the payment service from which loaned funds are provided to merchants in need of capital, a high-yield savings account, an investment account, and/or any other type of account having a yield that is potentially higher than a yield of the merchant account. In some instances, the merchant or user may select the account directly or the techniques may determine an account based on the level of risk desired by the merchant or user.

In some instances, the merchant or user may accept the offer to transfer some or all of the surplus funds from the primary account to the separate (secondary) account. The merchant or user may set the amount of the funds, which may initially be suggested to the merchant or user. In response to receiving this acceptance, the techniques may facilitate transfer of the funds from the primary account to the separate account. The techniques may begin tracking the yield generated on behalf of the merchant or user based on the account selected, the amount of the funds, the length the funds remained in the separate account, and the like.

In some instances, the techniques may also continue to apply the predictive model(s) for determining when to transfer some or all of these funds back into the primary account. For example, the predictive model(s) may determine when the primary account is predicted to dip below the minimum balance for the example merchant or user and may transfer the funds back into the primary account (or may provide an offer for the merchant to do so) prior to the predicted time. Thus, the example merchant or user is able to earn a higher yield while still relying on the techniques to signal to the merchant the appropriate time to move the funds back into the primary account such that they are available for use by the merchant or user. In still other instances, the payment service may make available the funds provided by the merchant or user in the separate account, if needed.

As noted above, the techniques may thus solve the problem of providing capital to merchants and/or users in need as well as the problem of merchants and/or users carrying too great of a balance in a relatively low-yield account. Further, the techniques operate together to ensure that an example merchant or user is able to predictively receive capital prior to the time it is needed and is able to earn a relatively higher-yield on surplus by funds by transferring these funds into an account that, for example, makes funds available to other merchants or users in times of capital need. Thus, the example merchant that is busy during the summer and slow during the winter may receive a capital advance in winter, while making available funds for use by other merchants in the summer. A merchant that is busy during the winter and slow in the summer, meanwhile, may receive capital in the summer and may provide capital for other merchants' use in the winter.

Furthermore, the techniques described below may net out, for a particular merchant or user, the amount of funds lent, and the amount of funds received as loaned funds for a particular amount of time. For instance, at the end of every year (or other time period), the techniques may determine the amount of funds that the example merchant or user received as loaned funds and the amount of funds that the merchant or user provided as surplus funds into the account for lending to other merchants or users. The difference between these numbers may determine whether the merchant or user is to pay back capital and/or interest or whether the merchant is to receive capital with interest. Furthermore, in some instances, the techniques may determine loan repayment terms for a particular merchant or user based at least in part on whether the merchant or user has provided or intends to provide surplus funds for use by other merchants or users. For example, the repayment terms may be more flexible and/or better (e.g., lower interest, longer term) in instances where a particular merchant or user has or intends to provide surplus funds for use by other merchants or users.

Furthermore, predictive management of account balances by the payment service system described herein provides technological advancements over prior systems. For instance, real-time and predictive generation of loan amounts for user accounts may reduce the number of network interface calls needed for capital funding when compared to prior systems where users must submit an application request for credit to a banking server, submit the completed application over the network, submit another signal to indicate that they've accepted the loan, and then finally the funds are transferred to the user's account. Moreover, and in accordance with at least one example, the payment service system intelligently generates the optimum amount of capital needed by the user for a given time period based on a user's transaction history on the payment service and can proactively provide the necessary funds prior to the user submitting a request over the network. Additionally, the payment service can perform immediate risk assessment and capital underwriting functionality without the payment service having to submit data requests over the network to a third-party credit reporting entity. Accordingly, examples of the present disclosure are able to reduce the computational burden and network congestion that can arise from a multitude of loan funding requests being received at a payment service system concurrently or in quick succession. That is, example embodiments disclosed herein provide technical advantages over prior solutions by reducing network traffic and improving network bandwidth for account management systems.

For small business owners in particular, the payables-and-receivables environment is typically fragmented and relies on unrelated tools and programs, making it difficult for an owner to manually consolidate and view such data. The techniques described herein constantly or periodically monitor disparate and distinct merchant accounts, e.g., accounts within the control of the payment service system, and those outside of the control of the payment service, to track true cash flow standing (payables, receivables, etc.) of the merchant. The techniques herein provide a consolidated view of the merchant's cash flow, predict capital needs, preemptively offer credit without merchant-initiated requests, move money between disparate accounts (merchant's, another merchant's, or even payment service's) in a frictionless and transparent manner.

Additional technical improvements are described below in the discussion of FIGS. 1-15. It is to be appreciated that while these examples are described with reference to merchants and merchant accounts, the techniques apply equally to other types of user accounts (e.g., personal checking accounts, personal savings accounts, etc.) as discussed above.

FIG. 1A illustrates an example environment 100 for performing techniques described herein. The example environment 100 includes one or more merchants 102, including a merchant 102(1), conducting transactions with one or more customers 106. For instance, FIG. 1A illustrates an example merchant 102(1) operating a POS device 104 for conducting transactions with one or more of the customer 106. In some instances, the POS device interacts with a payment service 108 over a network, with the payment service 108 processing payments for the transactions between the customers 106 and the merchant 102(1). The network 110 may represent any combination of wired and/or wireless networks. Furthermore, as described herein, a "merchant" can be any entity that offers items (e.g., goods or services) for purchase or other means of acquisition (e.g., rent, borrow, barter, etc.). The merchant can offer items for purchase or other means of acquisition via brick-and-mortar stores, mobile stores (e.g., pop-up shops, food trucks, etc.), online stores ("ecommerce"), combinations of the foregoing, and so forth. In case of a peer-to-peer (P2P) scenario, the merchant 102 and customer 106 can be a first P2P customer and a second P2P customer, respectively, capable of transferring money to each other via a P2P payment application.

Figure 1B:
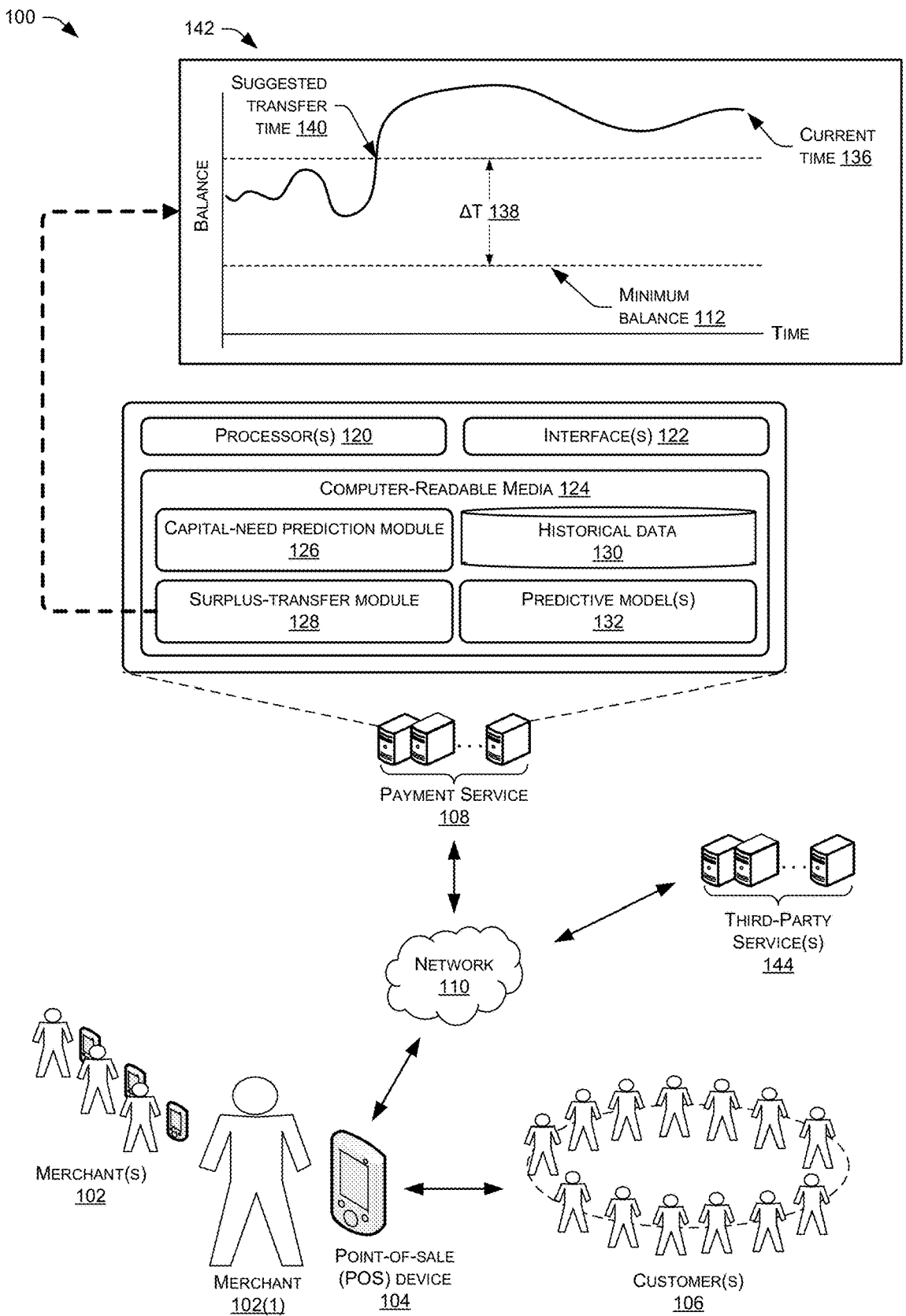
FIG. 1B illustrates the example environment of FIG. 1A in which the payment service identifies a time at which a particular merchant account has a relatively high balance and, in response, facilitates transfer of an amount of funds into a separate account that has a yield that is higher than a yield of the merchant account.
Figure 2:
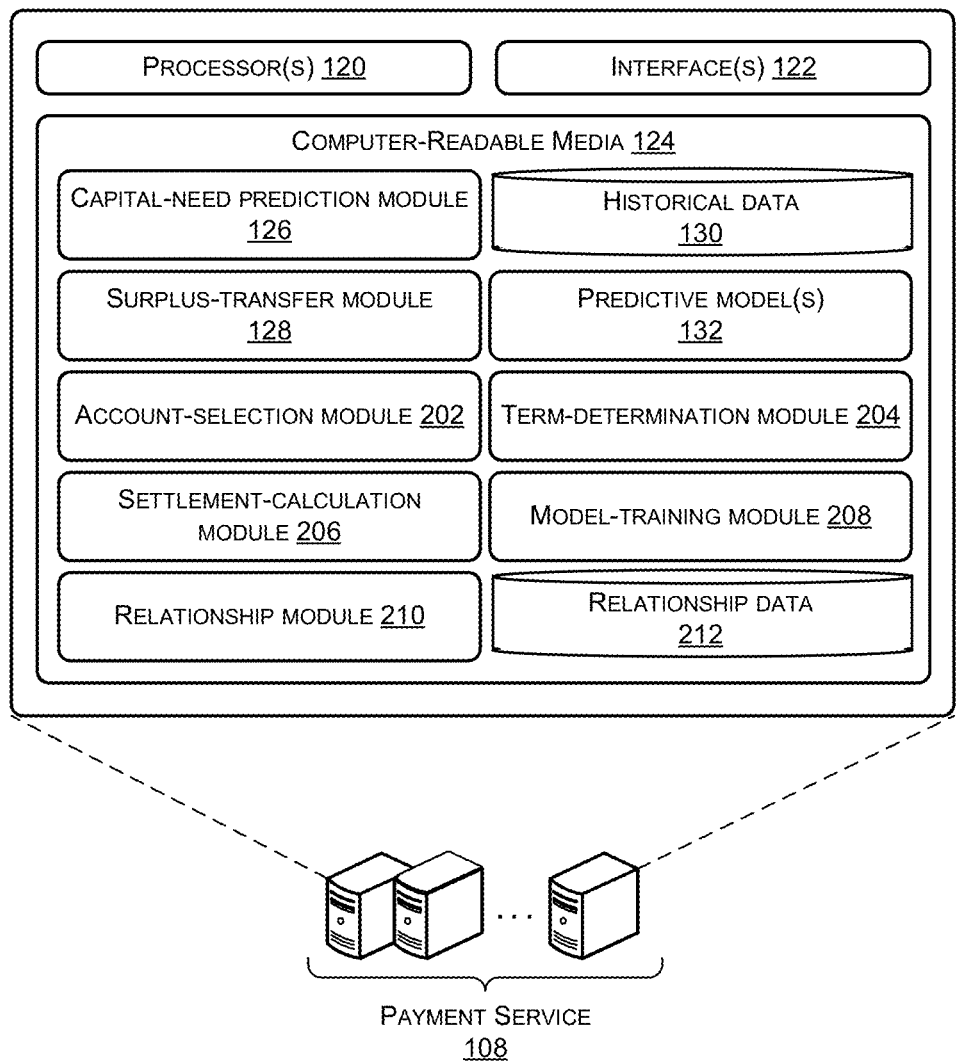
FIG. 2 illustrates example components of the payment service of FIGS. 1A-B for performing the techniques described herein.

As illustrated, the payment service 108 may comprise one or more server computing devices comprising components such as one or more processors 120, one or more interfaces (e.g., network interfaces) 122, and computer-readable media 124. The computer-readable media may store a capital-need prediction module 126, a surplus-transfer module 128, historical data 130 associated with the merchants 102, and one or more predictive models 132. FIG. 2 illustrates additional example components that the server computing devices of the payment service 108 may include. In addition, while FIGS. 1A-B illustrate the payment service storing the historical data 130, in some instances the payment service 108 may acquire some or all of the historical data 130 from one or more third-party (3P) services 144. For example, the 3P services 144 may comprise banks or other financial institutions storing information associated with merchant or user accounts. In these instances, the payment service 108 may access the information via API calls or the like over the network 110 with express consent/request of the merchants or other users.

As FIG. 1A illustrates, the capital-need prediction module 126 may generate data 134 indicating a balance of a merchant account as that balance changes over time. In some instances, the data 134 or similar data may be presented to the merchant or other users, via POS devices, client devices, and/or the like. While FIG. 1A illustrates a single merchant account, in this instance corresponding to a merchant account of the merchant 102(1), it is to be appreciated that the capital-need prediction module 126 may generate this information for the additional merchants 102, customers 106, or other any other user associated with the payment service 108. In any event, the capital-need prediction module 126 may access the historical data 130 associated with the merchant 102(1) to determine the balance of the merchant account as the balance changes over time. Furthermore, while the generated data 134 illustrates the balance of the account as the balance changes over time, in other instances the data displayed to the user may illustrate varying historical data (e.g., cash flow) and/or minimum-balance data for a specific item, a specific use-case, a specific merchant location, and so forth.

Historical data 130 may include data such as: a current balance in the merchant account; recurring deposits to the account (e.g., a weekly or monthly paycheck), or other type of deposit made into the account on a recurring periodic basis; recurring withdraws, outflows, and bill payments made out of the account on a recurring periodic basis; pending activity, such as written but un-cashed checks; payment transactions performed on the POS devices or through ecommerce applications; and/or any other recurring and/or user designated activity involving the selected account.

Furthermore, the capital-need prediction module 126 may utilize the historical data 130 to determine a minimum balance 112 that the merchant account is to maintain over time. For example, the capital-need prediction module 126 may analyze the historical data 130 associated with the merchant and/or with other similarly situated merchants to determine a minimum balance that the merchant 102(1) is to maintain in the merchant account in order to ensure steady operation of the business of the merchant. In some instances, the minimum balance is determined and/or suggested by the capital-need prediction module 126 based on analysis of the historical data 130. In other instances, the minimum balance 112 is set by the merchant 102(1) (e.g., via the POS device 104). In still other instances, the merchant 102(1) may provide an indication of a desired level of risk, which, in combination with analysis of the historical data 130 by the capital-need prediction module 126, may be used to determine the minimum balance 112. It is also to be appreciated that while FIG. 1A illustrates a constant minimum balance, in some instances the minimum balance 112 may vary over time, such as based on seasonality of a business of a merchant 102(1), upcoming events that occur near the location of the merchant and are predicted to result in an increase of payments into and/or out of the merchant account, and/or the like.

As FIG. 1A further illustrates, the capital-need prediction module 126 may store information regarding the past balance of the merchant account as the balance has changed over time, as well as a current balance of the merchant account at a current time 114. In addition, the capital-need prediction module 126 may use one or more predictive models 132 to determine a predicted time 116 at which the merchant account of the merchant 102(1) is predicted to dip below the minimum threshold. That is, the predictive model may, based on historical data of the merchant 102(1) and/or other similarly situated merchants, predict a future time at which the merchant account 102(1) would dip below the minimum balance 112 if the merchant 102(1) is not provided with some amount of loaned funds.

In response to determining the predicted time 116, the payment service 108 may determine an amount of funds to offer to loan to the merchant 102(1) such that, if the funds were accepted, would allow the merchant account to keep a balance that is greater than the minimum balance 112. That is, based on the historical data 130, the capital-need prediction module 126 may determine the amount of funds to offer as a loan to the merchant 102(1). After doing so, the capital-need prediction module 126 may generate an offer to extend capital to the merchant account of the merchant 102(1) such that the balance of the merchant account does not dip below the minimum balance 112. In some instances, the payment service 108 may generate data representing a graphical user interface (GUI) and may send this data to the POS device or other device of the merchant 102(1) for presenting the offer to the user. Of course, while one example manner of presenting this offer is described, it is to be appreciated that other methods for extending the offer may be used.

Upon receiving the offer for the capital, the merchant 102(1) may determine whether to accept the offer. In some instances, the merchant 102(1) may also request more or less funds than offered by the payment service 108. If the merchant 102(1) accepts the offer, then the payment service 108 may transfer the determined amount of loaned funds to the merchant account a transfer time 118 that is at or prior to the predicted time 116 at which the merchant account was predicted to dip below the minimum balance 112. Furthermore, in some instances the merchant may pay back the loaned funds over a predefined payment schedule. In some instances, a portion of each payment transaction processed by the payment service 108 may be withheld by the payment service 108 (with the consent of the merchant) to pay back the loaned funds amount until paid in full (or until a predefined amount has been paid).

In order to determine the predicted time 116 at which the merchant account is predicted to dip below the minimum balance 112 in this manner, the capital-need prediction module 126 may generate one or more of the predictive models 132 for the merchant account and/or for multiple merchant accounts. In some instances, the capital-need prediction module 126 uses the historical data 130 associated with the merchant 102(1) and/or with one or more other merchants to train the predictive models. As noted above, the predictive models 132 may comprise neural networks, support vector machines, or any other type of trained classifier.

FIG. 1B, meanwhile, illustrates the example environment 100 where the surplus-transfer module 128 generates data 142 for determining whether to generate an offer for the merchant 102(1) to transfer funds from the merchant account to a separate account having a yield that is different, e.g., higher, than the merchant account. In some instances, the data 142 or similar data may be presented to the merchant or other users, via POS devices, client devices, and/or the like. FIG. 1B further illustrates that the surplus-transfer module 128 is configured to access the historical data 130 to determine the balance of the merchant account until a current time 136. In addition, the surplus-transfer module 128 may be configured to determine a balance above which funds in the merchant account may be deemed surplus funds, such that the merchant may choose to move some or all of these funds to a separate account(s) having a higher yield than the merchant account. In some instances, this balance may comprise a threshold difference 138 between the minimum balance 112 and the current balance. That is, the surplus-transfer module 128 may determine to suggest a transfer of funds from the merchant account to the separate account if the difference between the current balance and the minimum balance (potentially for some amount of time) is greater than the threshold difference 138.

In the illustrated example, the surplus-transfer module 128 may identify a suggested transfer time 140, representing a point in time where the balance of the merchant account of the merchant 102(1) has become greater than the summation of the minimum balance 112 for the merchant 102(1) and the threshold difference 138. In some instances, the minimum balance 112 and/or the threshold difference 138 may be based at least in part on a level of risk desired by the merchant 102(1). In other instances, the minimum balance 112 and/or threshold difference 138 may be based on a merchant-defined value or criterion, such as specific amount, specific location, specific time, specific purpose, specific item, and so on.

After identifying the suggested transfer time 140, the surplus-transfer module 128 may thereafter generate an offer to move some or all of the surplus funds (e.g., the funds greater than the minimum balance 112 and the threshold difference 138) to a separate account having a higher yield than a yield of the merchant account. In some instances, the surplus-transfer module 128 may generate and send, to the POS device 104 or other device of the merchant 102(1), data for presenting a GUI including the offer or suggestion to move funds from the merchant account to a higher-yielding account. In some instances, the offer may suggest an amount of funds, a length to keep the funds in the separate account, which account of multiple separate accounts to utilize, and the like. In some instances, the merchant 102(1) may determine the amount of funds, may select the account, may select a desired level of risk (and, hence, yield), and the like.

Responsive to receiving acceptance of the offer to move funds from the merchant account to the separate account, the surplus-transfer module 128 may facilitate transfer of the specified amount of funds into the selected separate account. In some instances, the surplus-transfer module 128 may automatically transfer some or all of the amount of funds back into the merchant account after a predefined condition is met, e.g., after an amount of time has lapsed. In addition, or in the alternative, the capital-need prediction module 126 may determine a time at which the balance of the merchant account is predicted to dip below the minimum balance 112 or below another balance and may cause some or all of the funds to transfer back into the merchant account for use in operating a business of the merchant.

In still other instances, the surplus-transfer module 128 and/or the capital-need module 126 may take into account one or more other factors when determining when to move the funds back into the merchant account. For example, these modules may identify events that are local to the merchant and are likely to affect payments into and/or out of the merchant account and may move the funds back into the merchant account prior to respective dates associated with these events. In addition, a seasonality of the merchant may be taken into account, such that the funds are moved back into the merchant account prior to the beginning of a relatively busy time of year for the merchant.

In some instances, the surplus-transfer module 128 facilitates transfer of the surplus funds from the merchant account to an account maintained by the payment service 108 for the purposes of lending funds to merchants in need of capital. That is, this account may comprise the funds used for lending funds to merchants predicted to dip below their respective minimum balances, such as discussed above with reference to FIG. 1A. As such, the capital-need prediction module 126 and the surplus-transfer module 128 may work in tandem to create an ecosystem where merchants have the ability to receive extended capital in instances where the module 126 predicts the merchants will dip below their respective minimum balances, as well as the ability to move their surplus funds to a higher-yielding account that is used for extending capital to other merchants in need of capital at different times.

FIG. 2 illustrates example components of the payment service 108 for performing the techniques described herein. As illustrated, the payment service 108 may include one or more processors 120, one or more interfaces 122, and computer-readable media 124. The computer-readable media may store the capital-need prediction module 126, the surplus-transfer module 128, the historical data 130, and the predictive models 132, as described above. In addition, the computer-readable media 124 may store an account-selection module 202, a term-determination module 204, a settlement-calculation module 206, and a model-training module 208.

The account-selection module 202 may function to select one or more accounts that respective merchants may transfer to move funds into from their respective merchant accounts. For example, the account-selection module 202 may enable an example merchant to select an account, having a higher-yield than a yield provided by the merchant account of the merchant, to which to transfer some or all of the example merchant's surplus funds, until such time as those funds are needed to operate the business of the merchant. The higher-yielding account may, in some instances, comprise an account operated by the payment service 108 for the purpose of extending capital to other merchants currently experiencing a capital need. Therefore, the example merchant may transfer an amount of funds into this pool for use by other merchants, while receiving a yield that is higher than the merchant would have received if the merchant had left the funds in the merchant account. Furthermore, this account may also be available to the example merchant at a later time when the example merchant experiences a time of capital need.

In some instances, a capital need may be identified based on or more of an array of factors. For example, a capital need may be identified from historical data 130 of a merchant or other use indicating a relatively-large recurring purchase, such as a large monthly, quarterly, or yearly purchase. In another example, capital need may be identified in response to determining that a merchant has hired one or more employees (or a relatively large number of employees compared to the merchant's historical hiring cycles), that the merchant has opened a new location, that the merchant has indicated a need or desire to order new equipment, or the like. In still other examples, capital need may be determined based on the presence of a relatively large unexpected (or expected) expense, upcoming tax payments, the addition of a new service at the merchant (e.g., offering a new payment method requiring use of new payment hardware), and/or the like.

In addition, or in the alternative, the higher-yielding account(s) may comprise an investment account, a high-yield-savings account, or any other type of financial account having a yield greater than that provided by the merchant account. In one example, the higher-yielding account may be a separate account associated with the payment service, or an external account associated with a third-party service provider and communicatively linked to the account of the user at the payment service. As described below, the higher-yielding account may comprise an account from which the payment service 108 may loan funds other merchants (in the form of extended capital).

Furthermore, in some instances the account-selection module 202 may receive a selection of the account from the merchants, while in other instances the account-selection module 202 may select the accounts for the merchants based on desired levels of risk and/or desired levels of returns (e.g., yields) specified by the merchants. In still other instances, the account-selection module 202 may suggest one or more accounts to the merchants based on information provided by the merchants (or similarly situated merchants), before receiving a final selection from each merchant.

The term-determination module 204, meanwhile, may determine loan terms associated with funds loaned to an example merchant. The loan terms may include information such as an amount of funds, a repayment period, an interest rate, a repayment schedule, and/or the like. In some instances, the term-determination module 204 may determine the loan terms based on an array of factors, including whether the example merchant has previously made available surplus funds for other merchants. For example, if the merchant has made surplus funds available for other merchants and is now receiving extended capital at a time of capital need, the merchant may receive more favorable terms than if the merchant is simply receiving but not extending capital. Furthermore, these terms may also be based on the amount of funds received by the merchant, the amount of funds previously provided by the merchant, the number of times the merchant has received and/or provided funds, and/or the like.

The settlement-calculation module 206 may function to determine, at the end of a time period (e.g., a year), an amount of funds to be repaid by a merchant. For example, payment service 108 may allow, over the course of a year or other time period, a merchant to both receive capital and move surplus funds to an account for use by other merchants (as determined by the payment service 108). At the end of the year or other time period, the settlement-calculation module 206 may net out the loaned funds received by the merchant from the surplus funds of the merchant made available for use by other merchants for determining the amount of funds owed by the merchant, if any. If the settlement-calculation module 206 determines that the merchant owes funds at the end of the time period, then the settlement-calculation module 206 may work in unison with the term-determination module 204 for determining terms for repayment of the balance.

The model-training component 208, meanwhile, may function to train the one or more predictive models 132 to, for example, determine when merchants are predicted to dip below their respective minimum balances, to determine the minimum balances, and the like. In some instances, the model-training module 208 uses historical data 130 associated with individual merchants and/or similarly situated merchants to train neural networks, support vector machines, or other trained classifiers for determining merchant minimum balances and/or times at which different merchants are predicted to dip below the minimum balances. These predictions may be used for determining when to generate an offer to extend capital to the merchants, as well as to determine the amount of funds to offer.

FIG. 2 further illustrates that the payment service 108 may store a relationship module 210 and relationship data 212 generated by the relationship module 210. In some instances, the relationship module 210 may function to identify merchants that are complementary to one another and, thus, may benefit from a relationship in which one merchant loans funds to the other merchant at certain times, and vice versa at other times. For example, the relationship module 210 may analyze historical data, such as balances of respective merchant accounts over time to identify merchants having seasonality complement one another. For example, the relationship module 210 may identify that a first merchant (e.g., a snow ski merchant) has a relatively high account balance in the winter months, but a relatively low balance in the summer months. Conversely, the relationship module 210 may identify a second merchant (e.g., a water ski merchant) that has a relatively high balance in the summer months and a relatively low balance in the winter months. In response to identifying these complementary merchants, the relationship module 210 may generate, or suggest generation of, a pool of at least these two merchants for both lending and receiving loaned funds.

To provide an example, if the first merchant has surplus funds in the wintertime, while the second merchant has a capital need in these months, then the payment service 108 may facilitate a transfer of surplus funds from the first merchant to the second merchant. As described above, the first merchant may receive a yield that is greater than a yield of the first merchant's primary account based on loaning these funds. Conversely, in the summertime when the second merchant has surplus funds and the first merchant has a capital need, the payment service 108 may facilitate transfer of funds from the second merchant to the first merchant.

Furthermore, while FIG. 2 illustrates components of the payment service 108 on one or more servers, it is to be appreciated that some or all of these components and functionality may reside on or be used with an application that executes on a device of a merchant or other user. For example, the information provided to and received from the merchant or other user may be provided to an application executing on a mobile device or other computing device of the merchant or other user. This application(s), provided by the payment service 108, may be configured to generate and populate UIs, such as the example UIs discussed below with reference to FIGS. 3-5, 9-13, and 16-27.

Figure 3:
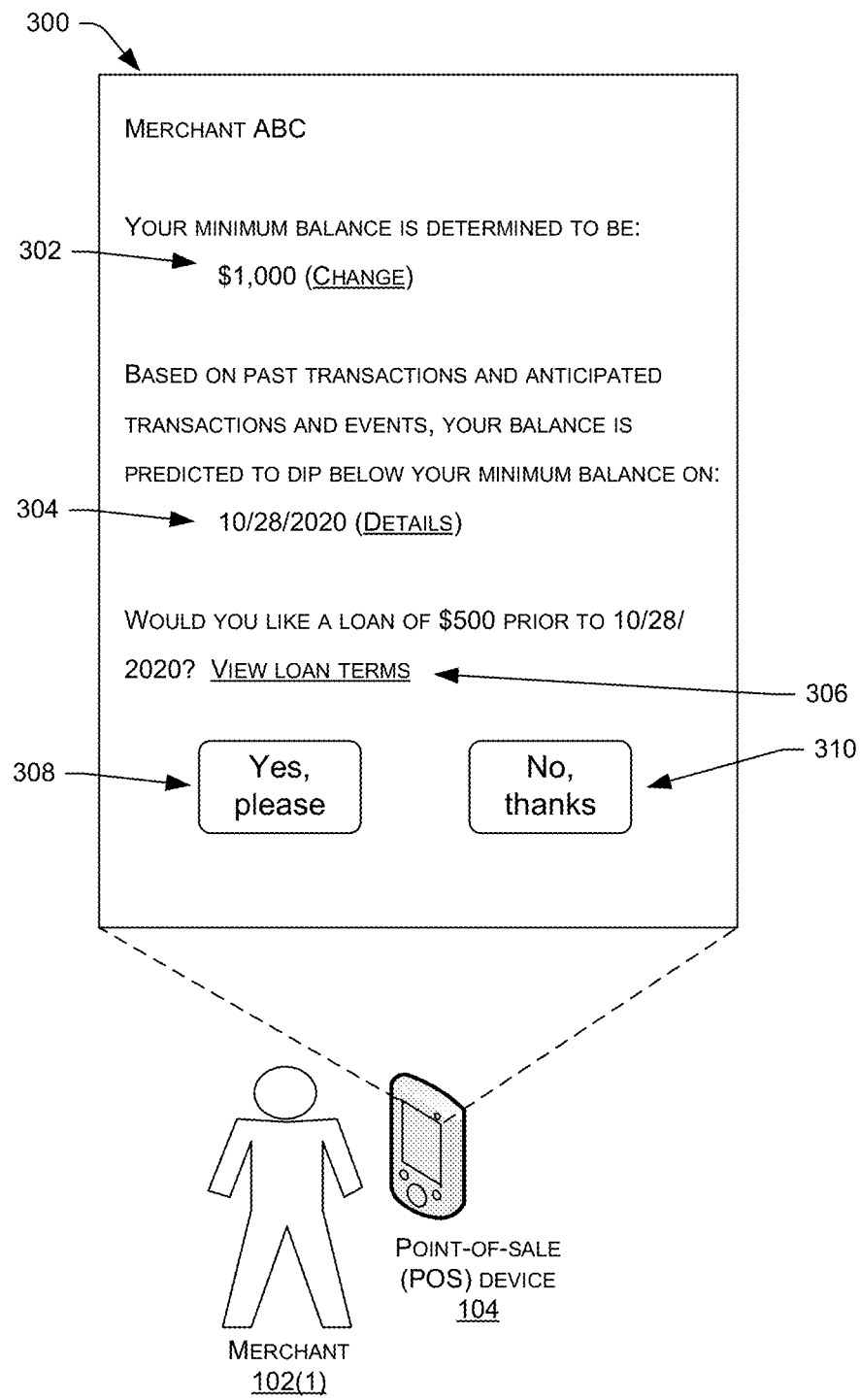
FIG. 3 illustrates an example user interface (UI) that the payment service may provide to a point-of-sale (POS) device or other merchant device for offering loaned funds to an example merchant.
Figure 4:
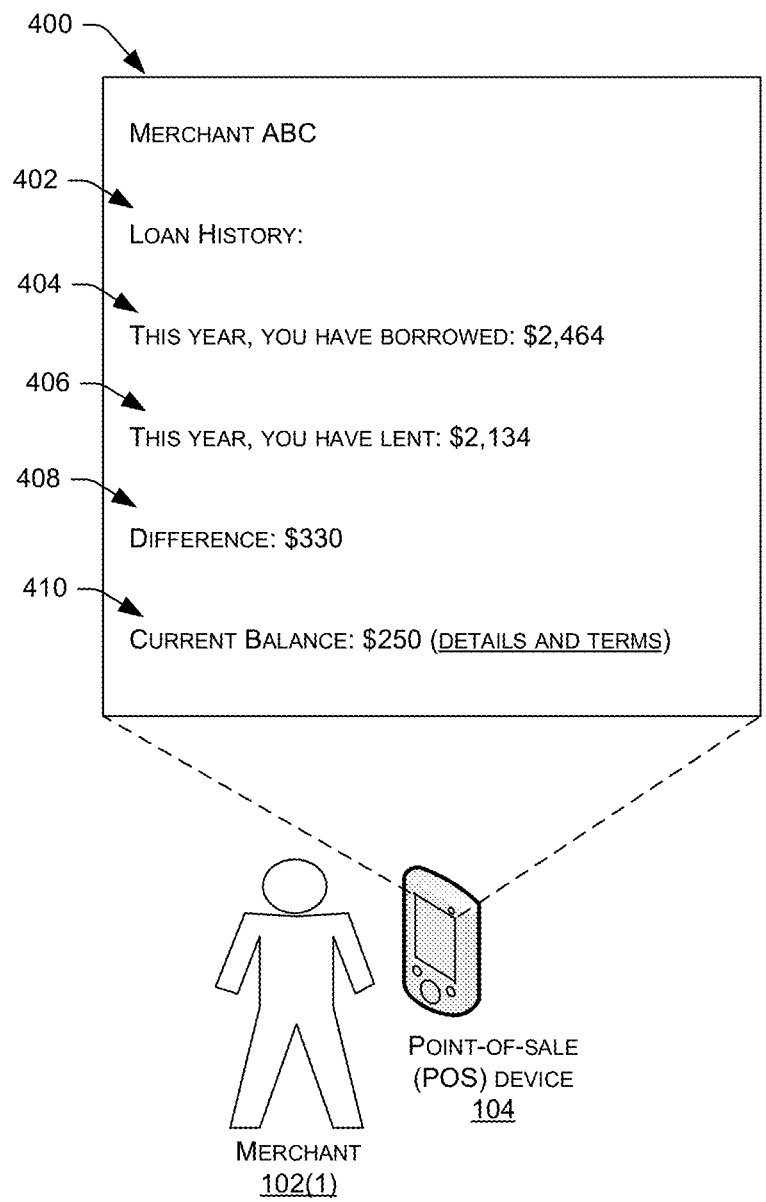
FIG. 4 illustrates an example UI that the payment service may provide to the POS device or other merchant device for indicating an amount of funds that the example merchant has received as loaned funds and the amount of funds that the example merchant has provided as loaned funds for use by other merchants.
Figure 5:
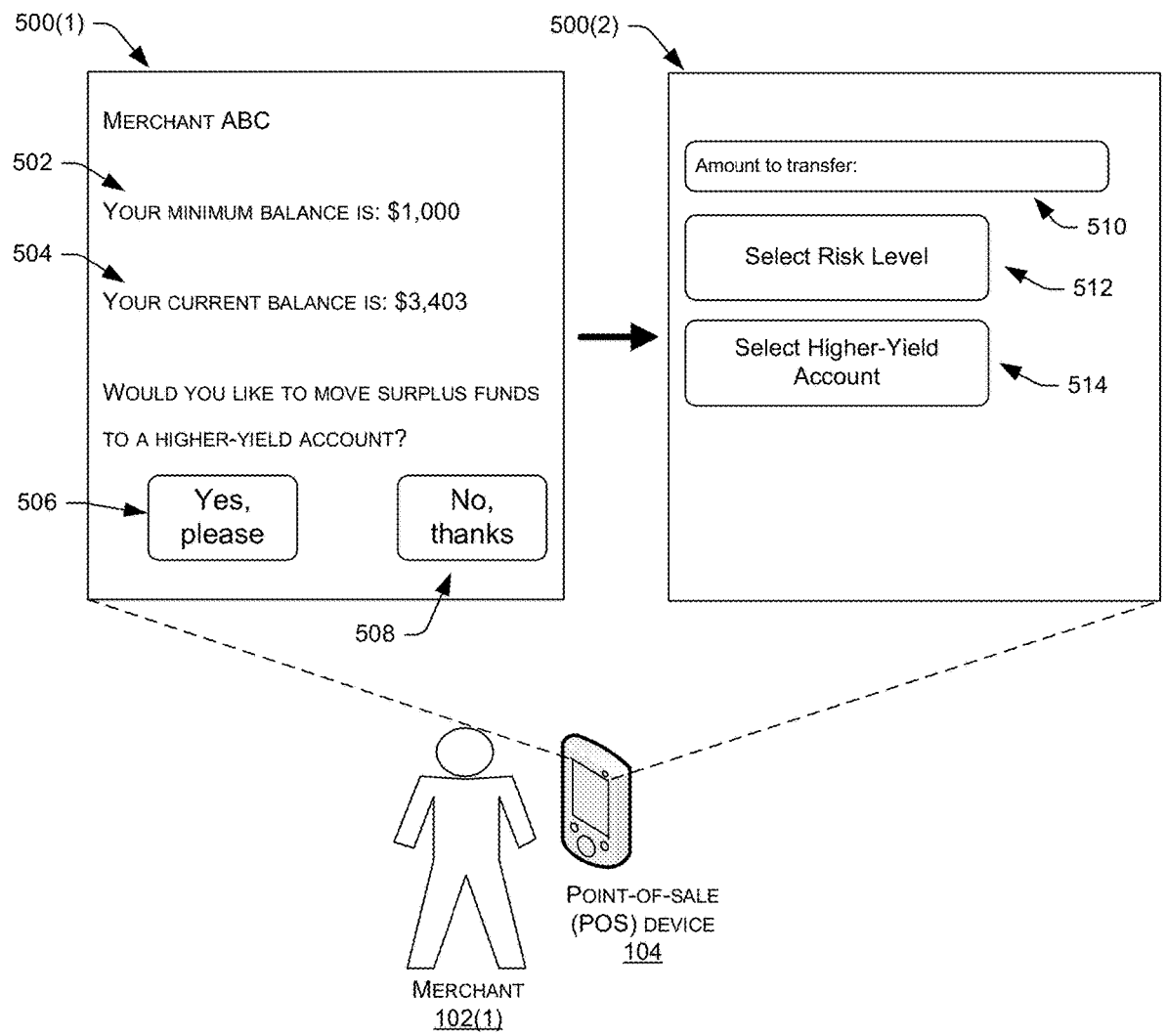
FIG. 5 illustrates example UIs that the payment service may provide to the POS device or other merchant device for offering to move funds from the example merchant account to a separate account having a yield that is higher than the example merchant account.

FIG. 3 illustrates an example UI 300 that the payment service 108 may provide to the device 104 or other merchant device of the merchant 102(1) for generating credit offer requests, and subsequently offering loaned funds to the merchant 102(1). In some implementations, generation of credit offer request and extension of credit may happen substantially contemporaneously. If the merchant interacts with the credit offer request, the payment service 108 may evaluate whether the merchant is eligible for credit and the terms at which such a credit can be extended. In yet other implementations, the credit may be extended without a formal credit offer request process, as the payment service 108 randomly or periodically underwrites for the merchant. Such preemptive underwriting can occur in the background as the merchant is performing transactions on the POS device. While FIGS. 3-5 illustrate example UIs, it is to be appreciated that the described techniques may utilize any other type of UIs, whether visual, audible, or the like.

As illustrated, the example UI 300 indicates that the payment service 108 has determined, at 302, that the merchant 102(1) is to keep a minimum balance of $1,000. In some instances, the payment service 108 may have determined this minimum balance based on historical data 130 associated with the merchant 102(1), such as historical transaction data, historical account-balance data and the like. Also as illustrated, the UI 300 may include an icon that, when selected, allows the merchant 102(1) to manually change this determined minimum balance.

In addition, the UI 300 indicates, at 304, that the capital-need prediction module 126 has predicted, using one or more predictive models, that the merchant account of the merchant 102(1) is predicted to dip below the minimum balance of $1,000 on Oct. 28, 2020. The UI 300 may also include an icon that, when selected, causes presentation of details associated with this prediction. These details may indicate predicted expenses coming out of the merchant account, prediction influx of customer payments into the merchant account, expenses that similarly situated merchants are experiencing, and/or the like.

Based on this prediction, the UI also includes, at 306, a query regarding whether the merchant 102(1) would like to receive extended capital in the amount of $500 prior to the Oct. 28, 2020 in order to avoid the merchant account dipping below the minimum balance. In some instances, this offer could indicate that it has been generated to cover a cost of a specific item for the merchant, for a specific location of the merchant, or the like. The UI 300 may also include an icon that, when selected, allows the merchant 102(1) to view details of the loan, potentially along with options to request different loan terms, such as a different loan amount, a different repayment period, a different interest rate, and/or the like. Finally, the UI 300 may include respective interactive icons 308 and 310 that provides a mechanism for the merchant 102(1) to communicate via device 104 whether or not they would like to receive the extended capital to avoid the predicted dip below the minimum balance.

FIG. 4 illustrates an example UI 400 that the payment service 108 may provide to the POS device 104 or other merchant device of the merchant 102(1) for indicating a loan history 402 of the merchant 102(1). In this example, the UI 400 indicates an amount of funds borrowed by the merchant for the year ($2,464) (404), an amount of funds the merchant has "lent" or made available to other merchants having a capital need ($2,134) (406), and a difference therebetween ($330) (408). In addition, the UI 400 includes a current balance of the outstanding loan funds (410). In this example, the merchant 102(1) has borrowed, over the course of the year, $330 more than the merchant 102(1) made available to other merchants, $250 of which still needs to be repaid by the merchant 102(1). The UI 400 may also include an icon that, when selected, allows the merchant 102(1) to view details and terms associated with the loan history of the merchant 102(1). In some instances, as noted above, the terms of the loan may be based, at least in part, on information such as whether the merchant 102(1) previously lent funds to other merchants in need. For example, some loan terms may be more favorable to the merchants that both receive and provide capital based on current needs of the merchant, such that merchants are incentivized to both receive and provide such capital. In one implementation, the UI 400 may also indicate options to consolidate this balance with other pending loans, and/or request review of the terms based on the annual borrowing and lending history.

FIG. 5 illustrates example UIs 500(1) and 500(2) that the payment service 108 may provide to the POS device 104 or other merchant device of the merchant 102(1) for offering to move funds from the merchant account of the merchant 102(1) to a separate account having a yield that is higher than the merchant account. As illustrated, the UI 500(1) may include, at 502, an indication of a minimum balance ($1,000) that has been calculated for the merchant 102(1), as well as a current balance of the merchant at 504 ($3,403). In this example, the surplus-transfer module 128 may have determined that the current balance exceeds the minimum balance by at least a threshold amount and, thus, that at least a portion of the current balance of the merchant 102(1) comprises surplus funds. As such, the UI 500(1) includes a query regarding whether the merchant 102(1) would like to move some or all of these surplus funds into a separate account having a higher yield than a yield provided by the merchant account. In this example, the UI 500(1) includes respective icons 506 and 508 for indicate whether the merchant 102(1) would like to move some or all of these surplus funds.

The payment service 108 may present the UI 500(2) on the POS device 104 or other merchant device in response to the merchant 102(1) selecting the icon 506 in this example. As illustrated, the UI 500(2) enables, at 510, the merchant to specify an amount of funds to transfer from the merchant account to the separate account. In some instances, the surplus-transfer module 128 may generate and present a suggested amount based on a predicted future balance, the amount of surplus funds, risk or yield desired by the merchant, or the like. The UI 500(2) further includes an icon at 512 for selecting a risk level (or, in some instances, a desired return level), which may be used for determining the suggested amount of funds to move to the separate account and/or for determining the account into which to move the funds. The UI 500(2) may further include, at 514, an icon for selecting an account from multiple accounts, some of these accounts may be created in real-time to accommodate for this transfer. Again, the surplus-transfer module 128 may determine or suggest the account based on the risk or return level specified by the merchant 102(1). In one implementation (not shown), the payment service 108 may automatically move specific amount of surplus funds to a high-yield account without merchant intervention, and send a notification to the merchant 102(1) on the POS device 104 or another associated merchant device indicating such a transfer.

Figure 6:
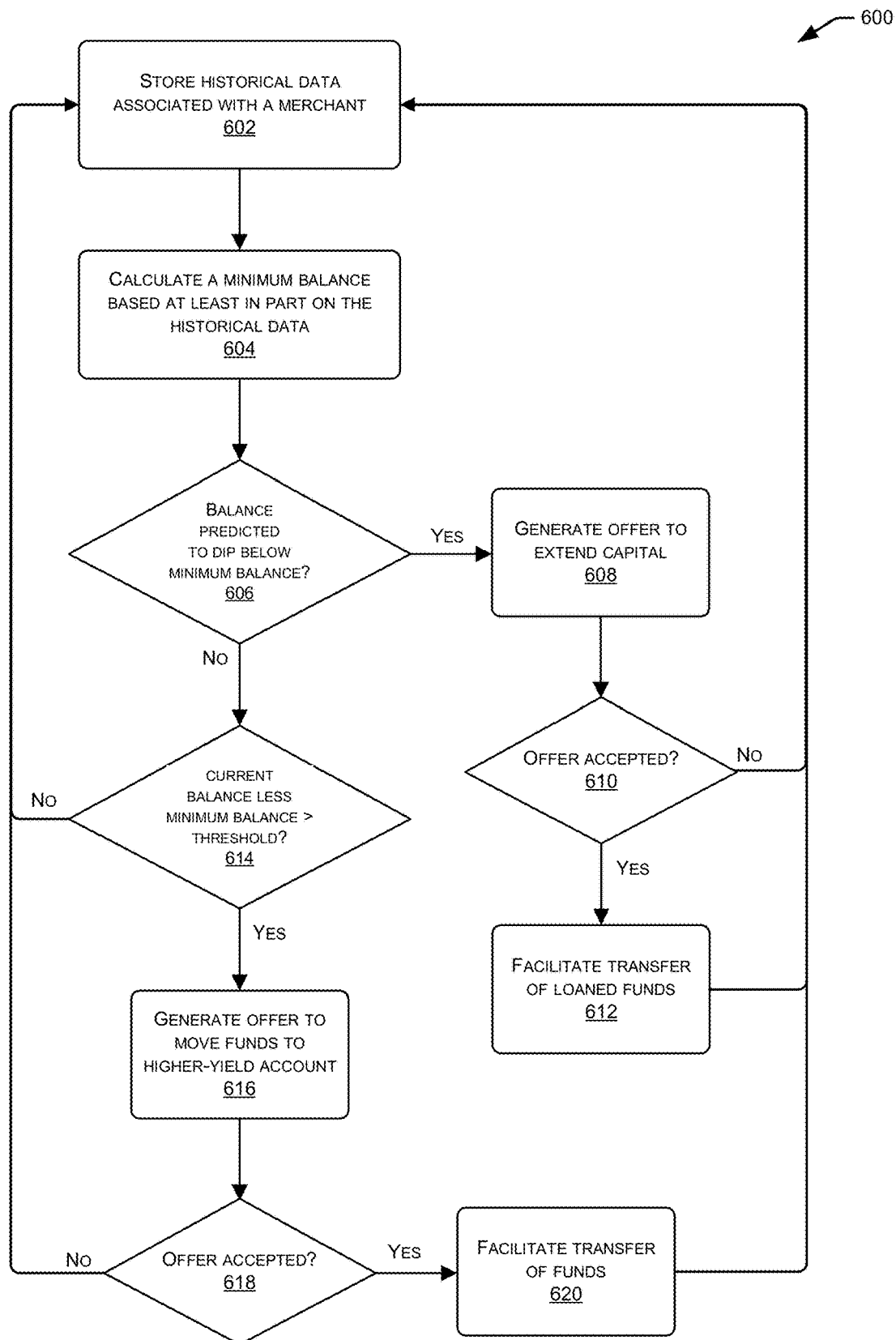
FIG. 6 illustrates a flow diagram of an example process for determining whether to generate an offer to advance capital to a merchant and/or whether to generate an offer to transfer funds on behalf of the merchant to a higher-yielding account.

FIG. 6 illustrates a flow diagram of an example process 600 for determining whether to generate an offer to advance capital to a merchant and/or whether to generate an offer to transfer funds on behalf of the merchant to an investment account, e.g., higher-yielding account. The process 600, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by components of the payment service 108, the POS device 104, other devices, and/or combinations thereof.

At an operation 602, the process 600 includes storing historical data associated with a merchant. This historical data may include, for instance, historical transaction data indicating payments into and/or out of a merchant account, as well as historical account-balance data indicating a balance of an account of the merchant over time.

At an operation 604, the process 600 includes calculating a minimum balance for the merchant based at least in part on the historical data. This may include analyzing the historical data to determine a lowest balance in a preceding time period, analyzing similarly situated merchants to determine their respective lowest balances in a preceding time period, receiving feedback from the merchant and/or other merchants, and/or the like. In some implementations, the process 600 also includes accessing historical data corresponding to other merchants, e.g., merchants that are similar to the merchant in terms of location, merchant classification, and so on. The historical data may also include data from third-party services, such as a bank or other financial institution maintaining account information of the merchant or user, an accounting service maintaining financial or statistical information associated with the merchant or user (e.g., sales histories, inventory volumes, etc.), or the like.

At an operation 606, the process 600 queries whether the balance is predicted to dip below the minimum balance and, if so, at what time. If the balance dips below a minimum balance ("Yes" branch of step 606), then at an operation 608 the process 600 may generate an offer to extend capital to the merchant. This offer may indicate an amount of funds being offered, a loan term, repayment terms, and/or additional information. At an operation 610, the process determines whether the offer has been accepted by the merchant. If the offer is accepted ("Yes" branch of step 610), then at an operation 612 the process 600 facilitates transfer of loaned funds in the determined amount into the merchant account and the process may return to the operation 602 to store (or update) the historical data associated with the merchant. In some instances, the loaned funds originate from an account maintained by the payment service 108 and contributed to by other merchants currently having surplus funds, as discussed above. If however, the offer is not accepted ("No" branch of step 610), or after facilitating the transfer of the funds, the process may return to the operation 602 to store (or update) the historical data associated with the merchant.

Returning to the operation 606, if the balance is not predicted to dip below the minimum balance ("No" branch of step 606), then at an operation 614 the process may determine whether a difference between a current balance of the merchant account and the minimum balance exceeds a predefined threshold. In some instances, this threshold may be based on a risk tolerance of the merchant and/or other factors. If the difference is greater than a threshold ("Yes" branch of step 616), then at an operation 616 the process 600 may generate an offer to move funds from the merchant account and into a separate account, such as an account providing a higher yield than the merchant account, an account having a lower risk than the merchant account, or the like. In some instances, this account comprises the account maintained by the payment service 108 for extending capital to merchants in capital need. If the difference is less than or equal to the threshold ("No" branch of step 616), the process may return to the operation 602 to store (or update) the historical data associated with the merchant. At an operation 618, the process determines whether the offer to move the funds is accepted. If "Yes", then an operation 620 the process facilitates transfer of the funds from the merchant account into the selected separate account. In some instances, the merchant selects the amount of the funds, the separate account, and the like. If, however, the offer is not accepted, or after the facilitating of the transfer of the funds, then process returns to the operation 602.

Figure 7:
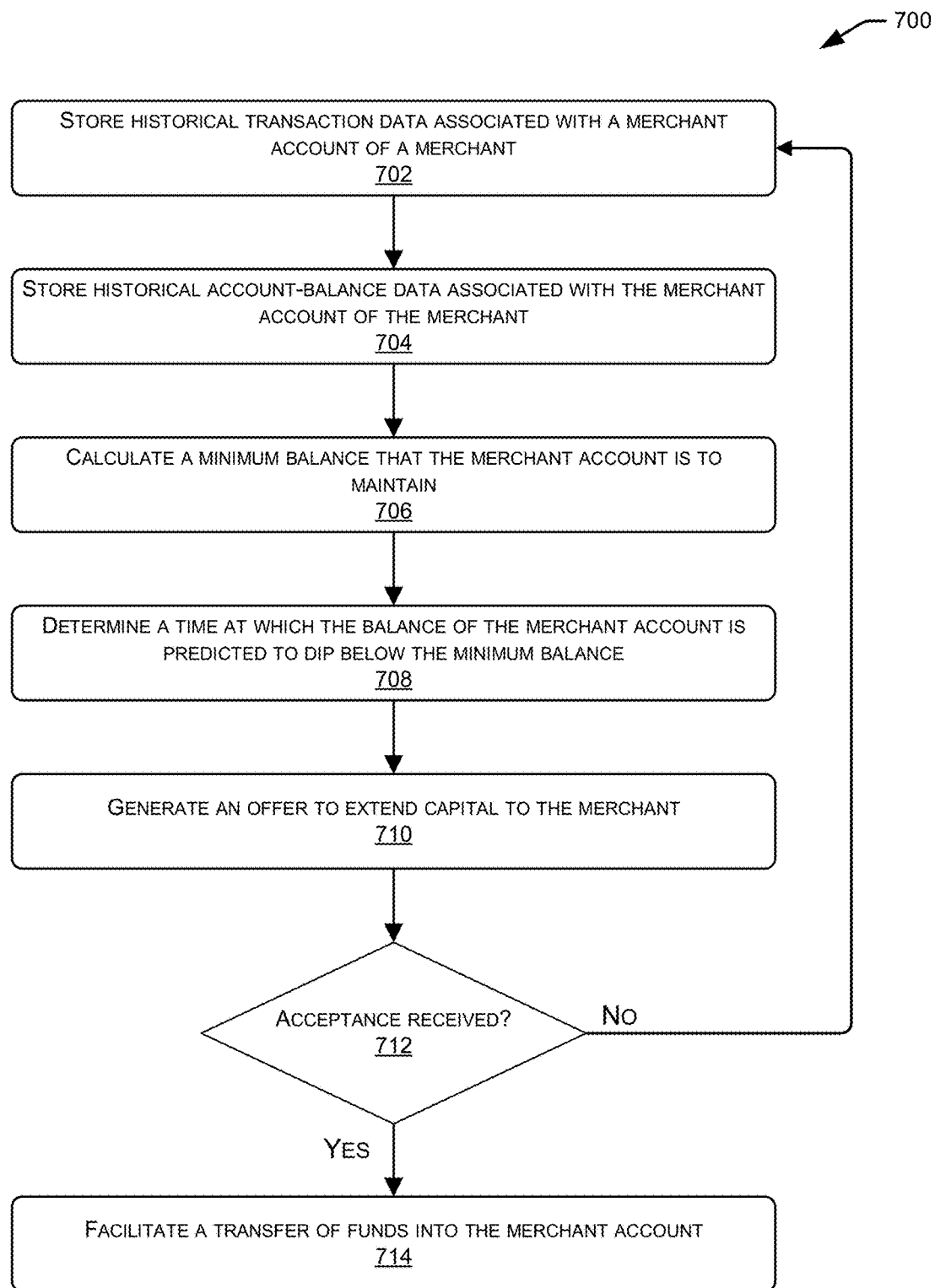
FIG. 7 illustrates a flow diagram of an example process for generating an offer to advance capital to an example merchant and facilitating transfer of the capital upon acceptance by the merchant.

FIG. 7 illustrates a flow diagram of an example process 700 for generating an offer to advance capital to an example merchant and facilitating transfer of the capital upon acceptance by the merchant. The process 700, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by components of the payment service 108, the POS device 104, other devices, and/or combinations thereof.

At an operation 702, the process 700 stores, in a database of a payment service, historical transaction data indicating payments into a merchant account and payments out of the merchant account over time. Of course, and as described above, the process 702 may additionally or alternatively include receiving this historical data from one or more third-party services, such as a bank or other financial institution, an accounting service, or the like. At an operation 704, the process 700 stores, in the database, historical account-balance information indicating a balance of the merchant account as the balance has varied over time. At an operation 706, the process 700 calculates, using the historical transaction data and the historical account-balance information, a minimum balance that the merchant account is to maintain. Furthermore, in some instances, the minimum balance may be associated with an upcoming event that is predicted to impact the balance of the merchant account. For example, if a concert, athletic event, or the like is scheduled to take place within a threshold geographical distance of a location of the merchant, and if the event is associated with the business of the merchant, then the process 700 may determine that the merchant is to maintain a relatively higher minimum balance based on the fact that the event may result in additional transactions at the merchant. Furthermore, determining the minimum balance may additionally or alternatively be based on seasonality of the business of the merchant. If, for instance, a certain time of year is associated with increased payments into and/or out of the merchant account, then the minimum balance may be determined based at least in part on this seasonality. Furthermore, and also as described above, the minimum balance may be associated with a particular day of the month of the merchant, a specific location of the merchant, a specific item offered by the merchant, or the like.

At an operation 708, the process 700 determines, using the historical transaction data, a time at which the balance of the merchant account is predicted to dip below the minimum balance. As described above, this may include applying one or more predictive models to the historical data associated with the merchant. Furthermore, in some instances, this time may be associated with the upcoming event that is predicted to impact the balance of the merchant account. For example, if a concert, athletic event, or the like is scheduled to take place within a threshold geographical distance of a location of the merchant, and if the event is associated with the business of the merchant, then the prediction may be based on the fact that the event may result in additional transactions at the merchant. Furthermore, predicting the time at which the balance may dip below the minimum balance may additionally or alternatively be based on seasonality of the business of the merchant. If, for instance, a certain time of year is associated with increased payments into and/or out of the merchant account, then the predictive models may determine a predicted time at which the balance may dip below the minimum balance based at least in part on this seasonality. In one example, the payment service generates the offer for the merchant and communicates the offer at an optimum future time before the predicted timing to increase the probability of the merchant or user accepting the capital offer (e.g., one week before the predicted balance). The optimum timing for generating and communicating the offer to the merchant may be based on applying machine learning model on timing data with respect to prior offer acceptances by the current merchant or merchants determined to be similar to the current merchant.

An operation 710, meanwhile, represents generating, based at least in part on the determining, an offer to extend capital to the merchant. The offer to extend capital may indicate a loan term and an amount of funds to advance to the merchant. An operation 712 queries whether an acceptance of the offer has been received. If so, then at an operation 714 the process 700 facilitates a transfer of the amount of funds from an account of the payment service to the merchant account at or prior to the determined time at which the balance of the merchant account is predicted to dip below the minimum balance. If an acceptance is not received, then the process 700 may loop back to the operation 702 to continue to store the historical data of the merchant over time.

Figure 8:
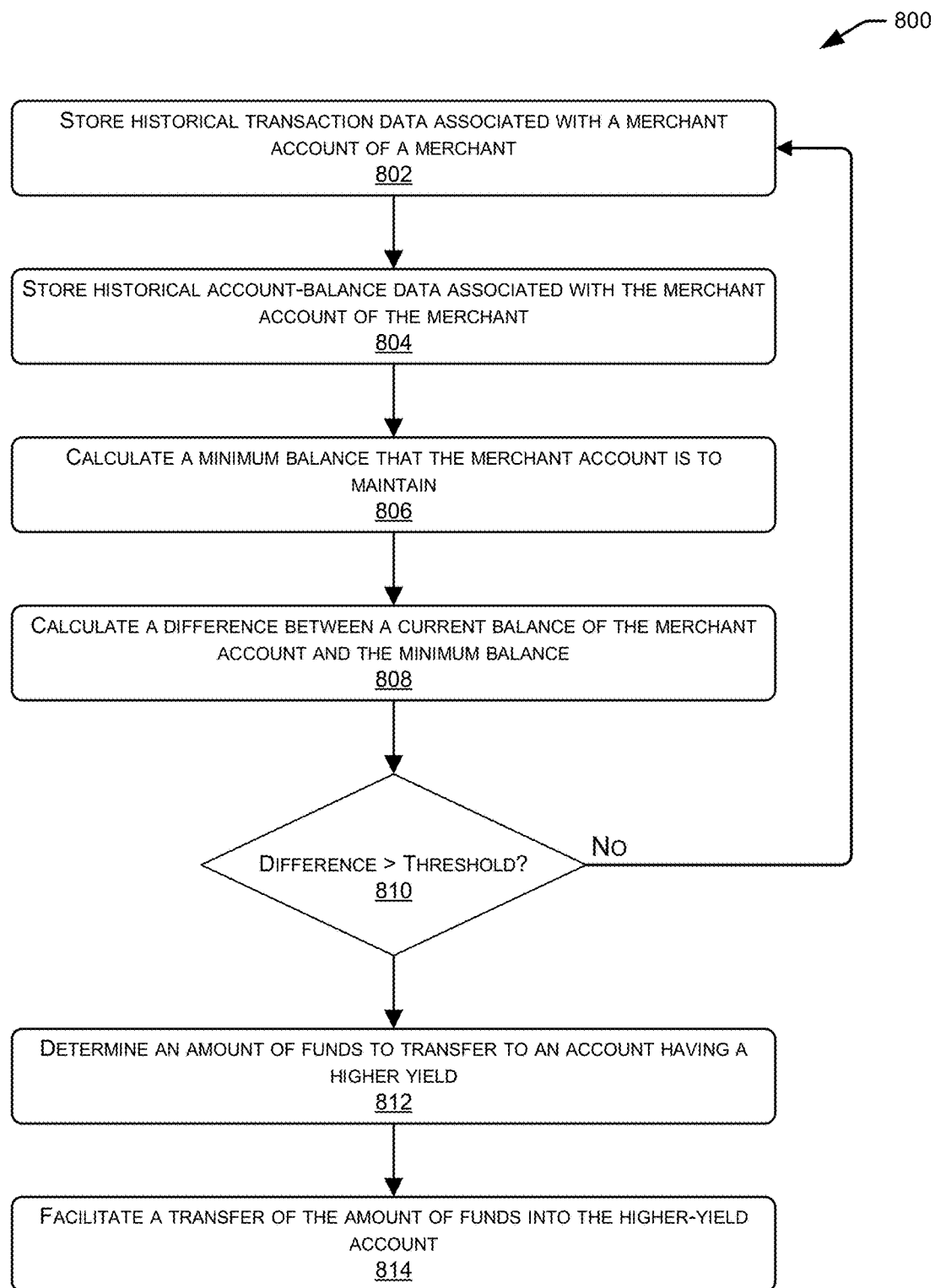
FIG. 8 illustrates a flow diagram of an example process for determining when a merchant account has surplus funds and, in response, facilitating transfer of an amount of funds from the merchant account to a separate account having a higher yield than the merchant account.

FIG. 8 illustrates a flow diagram of an example process 800 for determining when a merchant account has surplus funds and, in response, facilitating transfer of an amount of funds from the merchant account to a separate account having a higher yield than the merchant account. The process 800, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by components of the payment service 108, the POS device 104, other devices, and/or combinations thereof.

At an operation 802, the process 800 stores, in a database of a payment service, historical transaction data indicating payments into a merchant account and payments out of the merchant account over time. At an operation 804, the process 800 stores, in the database, historical account-balance information indicating a balance of the merchant account as the balance has varied over time. At an operation 806, the process 800 calculates, using the historical transaction data and the historical account-balance information, a minimum balance that the merchant account is to maintain. Furthermore, in some instances, the minimum balance may be associated with an upcoming event that is predicted to impact the balance of the merchant account. For example, if a concert, athletic event, or the like is scheduled to take place within a threshold geographical distance of a location of the merchant, and if the event is associated with the business of the merchant, then the process 800 may determine that the merchant is to maintain a relatively higher minimum balance based on the fact that the event may result in additional transactions at the merchant. Furthermore, determining the minimum balance may additionally or alternatively be based on seasonality of the business of the merchant. If, for instance, a certain time of year is associated with increased payments into and/or out of the merchant account, then the minimum balance may be determined based at least in part on this seasonality.

At an operation 808, the process calculates a difference between a current balance of the merchant account and the minimum balance and, at an operation 810, determines whether the difference exceeds a threshold amount. If so, then at an operation 812 the process 800 determines an amount of funds to transfer from the merchant account to a separate account. As noted above, the separate account may provide a yield that is greater than a yield provided by the merchant account, may be associated with a lower risk than the merchant account, may comprise an account from which the merchant provides payment for loaned funds, and/or the like. In some instances, the process 800 may further determine which one or more separate accounts into which to transfer the funds (or which account(s) to suggest to the merchant or other user). For example, the process 800 may analyze which separate account(s) the merchant or other user has previously selected, which separate account(s) best suits the risk profile of the merchant or other user, or the like.

Finally, at an operation 814, the process 800 facilitates a transfer of the amount of funds from the merchant account into the separate account. In addition, and as noted above, the process 800 may further include predicting a later time at which the merchant is likely to need these surplus funds for operation of the business of the merchant and, in response, transferring some or all of these funds back into the merchant account prior to this predicated time. Further, if the process determines, at the operation 812, that the difference is not greater than the threshold, then the process 800 loops back to store the historical data at the operation 802.

Figure 9:
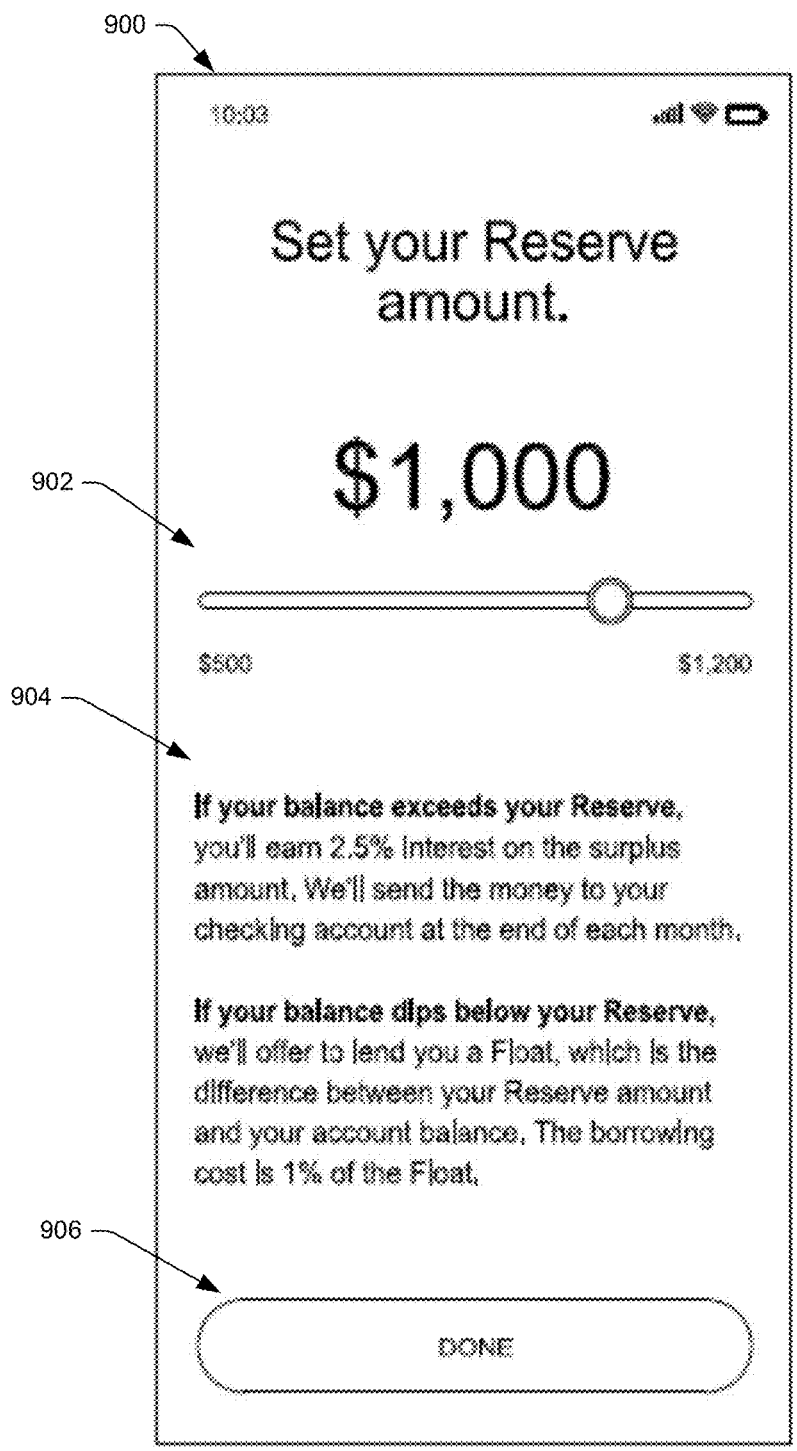
FIG. 9 illustrates another example UI that the payment service may provide to the POS device or other client device for offering loaned funds and for offering interest on surplus funds may.

FIG. 9 illustrates another example UI 900 that the payment service 108 may provide to the POS device 104 or other client device for offering loaned funds and for offering interest on surplus funds. In this example, the UI 900 includes an interactive UI element, in this instance a slider 902, to enable a merchant or other user to set a "reserve" amount associated with their account. In this example, the user has selected a reserve amount of $1,000. This reserve amount may comprise a balance below which the merchant or other user may desire to receive extended capital (i.e., a "float" as described below) and/or a balance above which the merchant or other user may begin earning a yield that is greater than a yield of the account when below the reserve amount. It is to be appreciated that while in this example and the examples of FIGS. 10-13 discussed below, the reserve amount represents the balance at which both a float may occur or a higher yield may be earned, in other instances different thresholds may be utilized. For instance, as illustrated and described with reference to FIGS. 1A-B, the techniques may utilize a first threshold below which the merchant or other user may receive a float (e.g., a "minimum balance" described above), in addition to a second, higher threshold over which a higher yield may be earned (a balance equal to the minimum balance plus some threshold amount).

As illustrated, the UI 900 further includes information 904 indicating that the user will receive interest on funds over the reserve (in this example, 2.5%) and that the user may receive a float if the balance is less than this reserve amount. The information also indicates a cost for receiving the float (in this example, 1% of the loaned amount). The UI 900 also includes an icon 906 that the user may select to set the reserve amount upon entering the desired reserve amount via the slide 902.

Figure 10:
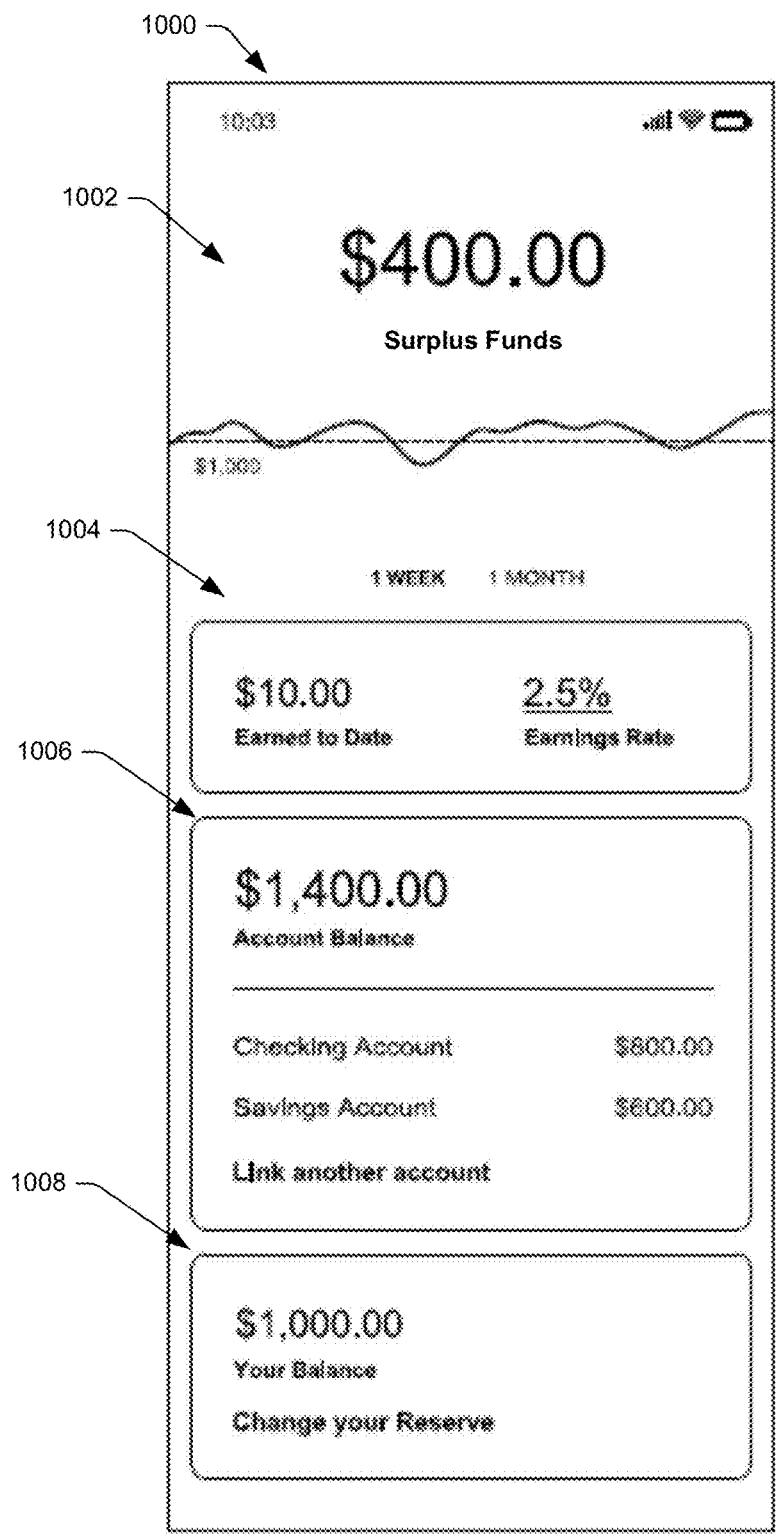
FIG. 10 illustrates another example UI that the payment service may provide to the POS device or other client device for indicating a current balance of an account. In this example, the balance of the account is greater than a "reserve" amount and, thus, the merchant or other user is earning interest on the surplus amount.

FIG. 10 illustrates another example UI 1000 that the payment service 108 may provide to the POS device 104 or other client device for indicating a current balance of an account. As illustrated, the UI 1000 includes information 1002 indicating a current balance of the account relative to the reserve amount as well as how the balance has changed over time. In this example, the current balance is $1,400, or $400 above the reserve amount set by the user. As such, the UI 1000 further includes information 1004 indicating the amount of interest the user has earned on the surplus funds. In this example, the user has $400 in surplus funds and is earning a 2.5% yield. Thus, the information indicates that the user has earned $10 via the yield on the surplus funds.

In addition, the example UI 1000 includes information 1006 indicating the balance of the user across sub-accounts of the user. In this example, the user has $800 in a checking account and $600 in a saving account, resulting in the total account value of $1,400 (or $400 over the reserve amount). Finally, the UI 1000 includes an information 1008 indicating a current reserve amount set by the user and an icon for changing this amount if so desired by the user.

In some instances, the amount of surplus funds may represent a prediction at a later point in the future. For example, using some of the techniques discussed below with reference to FIGS. 16-27, the application generating the UI 1000 may predict that the account will have the illustrated amount of surplus funds (e.g., $400) at a later date in the future. The user may use the UI 1000 and/or other described UIs for instructing the application to take action on the surplus funds (e.g., move to a higher-yield account, etc.) in response to the prediction coming to fruition, such as the amount of surplus funds being greater than a threshold.

Figure 11:
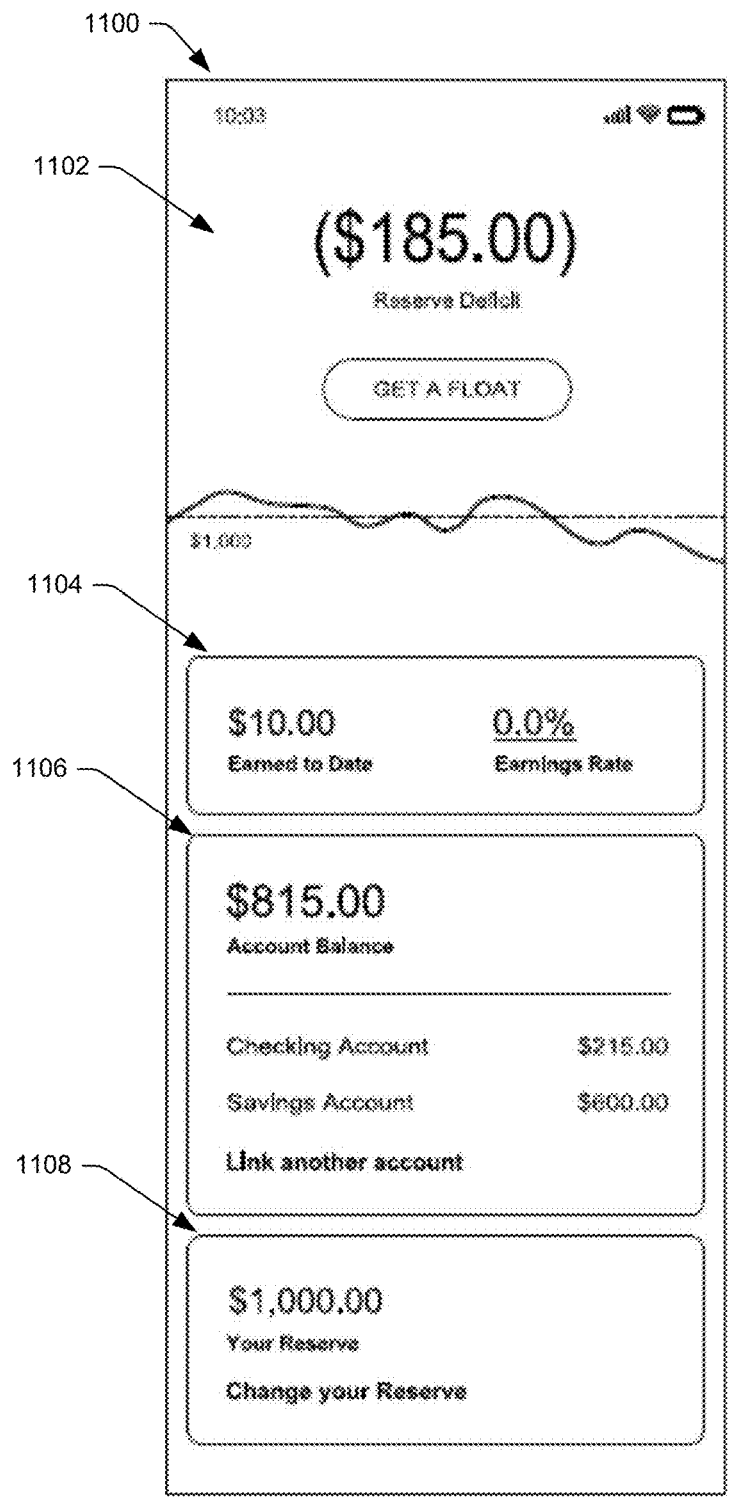
FIG. 11 illustrates another example UI that the payment service may provide to the POS device or other client device for indicating a current balance of an account. In this example, the balance is less than the reserve amount and, in response, the UI includes an icon for requesting to receive a float to bring the balance up to or beyond the reserve amount.

FIG. 11 illustrates another example UI 1100 that the payment service 108 may provide to the POS device 104 or other client device for indicating a current balance of an account. As illustrated, the UI 1100 includes information 1102 indicating a current balance of the account relative to the reserve amount as well as how the balance has changed over time. In this example, the current balance is $815, or $185 below the reserve amount set by the user. The UI 1100 also includes an icon to enable a user to request a float, such as an amount of loaned funds equal to the difference between the reserve amount and the current balance. In some instances, if the user has previously requested to participate in receiving floats, the payment service may automatically provide this float amount to the user account.

The UI 1100 further includes information 1104 indicating the amount of interest the user has earned to date on surplus funds (in this example, the $10 discussed above with reference to FIG. 10), as well as the interest or yield currently being earned (in this example, 0% given that the balance is less than the reserve amount).

In addition, the example UI 1100 includes information 1106 indicating the balance of the user across sub-accounts of the user. In this example, the user has $215 in a checking account and $600 in a saving account, resulting in the total account value of $815 (or $185 below the reserve amount). Finally, the UI 1100 includes an information 1108 indicating a current reserve amount set by the user and an icon for changing this amount if so desired by the user.

In some instances, the reserve deficit, illustrated via the information 1102, may represent a predicted deficit at a future time. That is, using some of the techniques discussed below with reference to FIGS. 16-27, the application generating the UI 1100 may predict that the account will have the illustrated deficit (e.g., $185) at a later date in the future. The user may use the UI 1100 and/or other described UIs for instructing the application to request a float, either now or in response to the predicted deficit coming to fruition.

Figure 12:
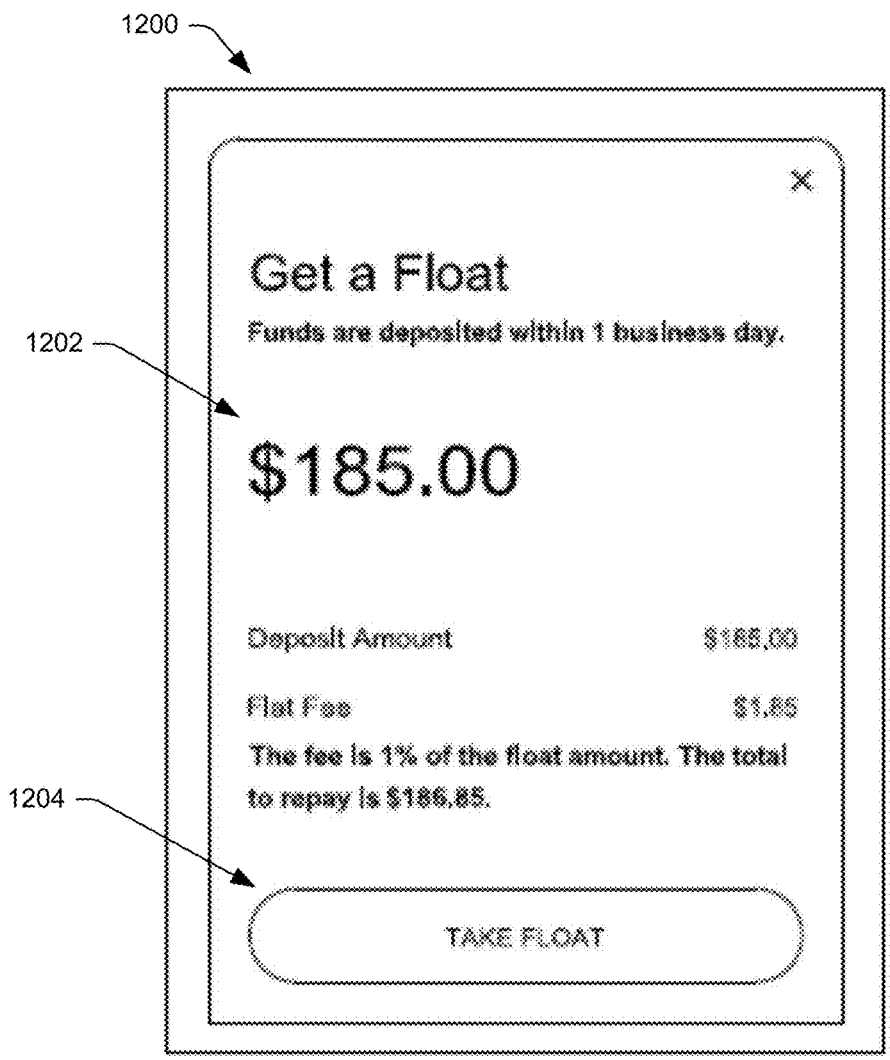
FIG. 12 illustrates another example UI that the payment service may provide to the POS device or other client device in response to the user selecting the icon illustrated in FIG. 11.

FIG. 12 illustrates another example UI 1200 that the payment service 108 may provide to the POS device 104 or other client device in response to the user selecting the icon to request a float illustrated in FIG. 11. In this example, the UI 1200 includes information 1202 indicating the amount of the float. While this amount is equal to the difference between the reserve amount and the current account balance in this example, in other instances the float amount may be greater or less than this amount. For example, the amount of the requested float may be determined using prediction data, discussed below with reference to FIGS. 16-27. In one example, the amount of the float may be based on a particular predicted deficit, such as the predicted deficit shown and discussed below at 2502. The UI 1200 further indicates the terms of the loan, which in this example indicates that the cost of the loan is equal to a flat fee in the amount of 1% of the loaned funds. Finally, the UI 1200 includes an icon 1204 to enable the user to request the float. Once the user requests the float, the float amount is deposited in a timely fashion (e.g., same day) to cover the capital need. Furthermore, in some instances the merchant may pay back the float over a predefined payment schedule. In some instances, a portion of each payment transaction processed by the payment service 108 may be withheld by the payment service 108 (with the consent of the merchant) to pay back the float amount until paid in full (or until a predefined amount has been paid).

Furthermore, and as noted both above and below, in some instances the payment service 108 may extend capital to a merchant or other user for a specified purpose, such as ordering inventory, preparing for a large expense, paying taxes, and/or the like. In these instances, the merchant or other user may specify the reason for the capital and may indicate to the payment service 108 when the capital is deployed in that manner. In some instances, during or after requesting the capital, the merchant may specify, to the payment service 108, the use of the capital (e.g., may identify needed inventory, a pending large payment, etc.) and may periodically indicate the continued use of this capital for the specified reason, if applicable. Thus, the applications provided by the payment service may help identify float and/or reserve values for the merchant or other user, as well as confirm the intentions of extended capital when or after deployment of the capital to the merchant or other user. Furthermore, in some instances the amount of the cash boost (float) offered to the merchant or other user may vary based on the specified reason for the cash boost or float. Further, this offered amount may increase over time in instances where the merchant or other users timely pays back some or all of the cash boost or float.

Figure 13:
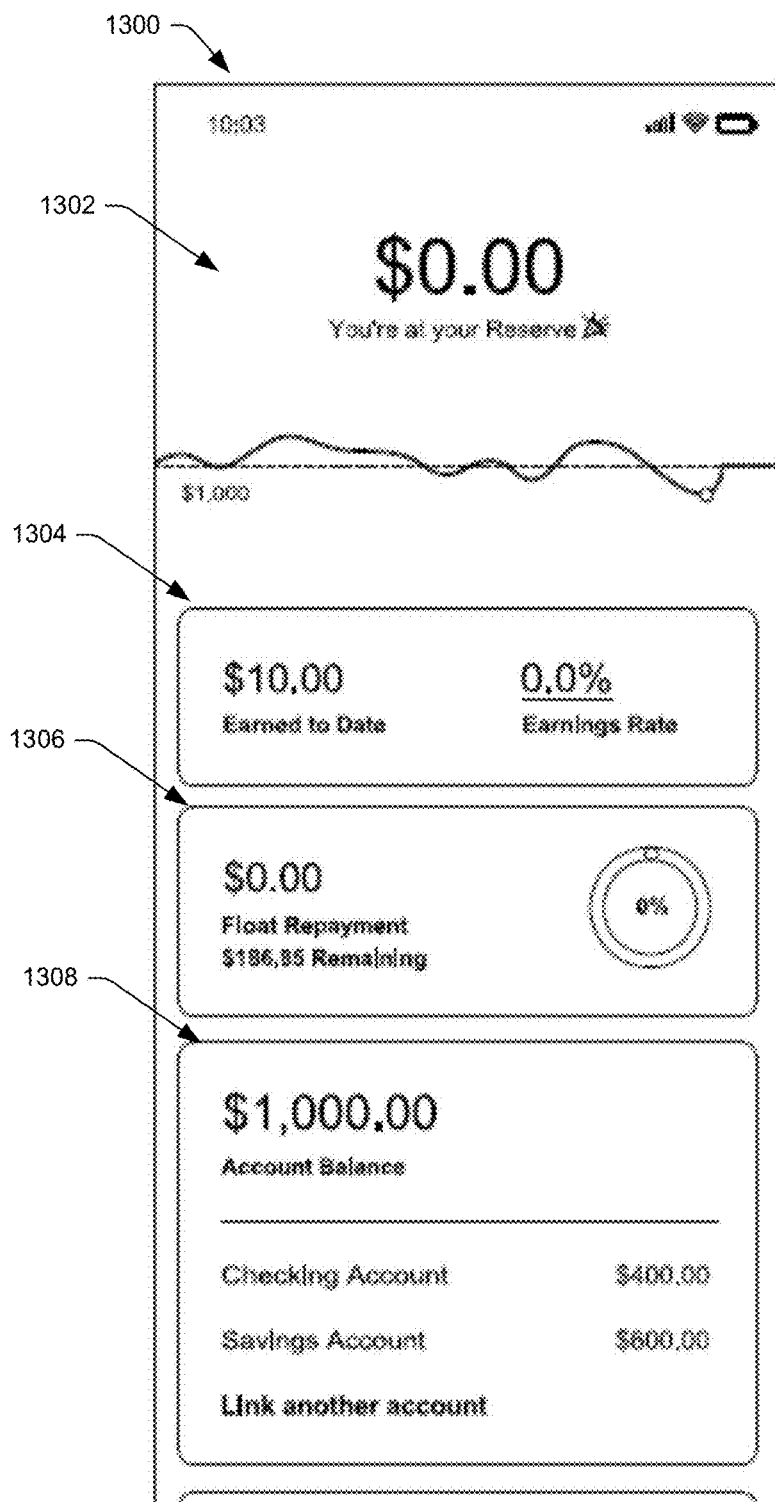
FIG. 13 illustrates another example UI that the payment service may provide to the POS device or other client device for indicating a current balance of an account. In this example, the balance is at the reserve amount for the example merchant or other user.

FIG. 13 illustrates another example UI 1300 that the payment service 108 may provide to the POS device 104 or other client device after the user has requested the float using the UI 1200 of FIG. 12. As illustrated, the UI 1300 includes information 1302 indicating that the current balance is $0 relative to the reserve amount—or that the account balance is equal to the reserve, given that the payment service 108 has provided the float amount to the user. In addition, the UI 1300 includes the information 1304 indicating the current earnings to date on surplus funds and the current yield being earned (again, 0%), as well as information 1306 regarding repayment of the float. In this example, the information 1306 indicates that the user still has the full $186.50 of the float amount to repay. Finally, the UI 1300 includes information 1308 indicating a current balance of the account and sub-accounts making up the larger account.

Figure 14:
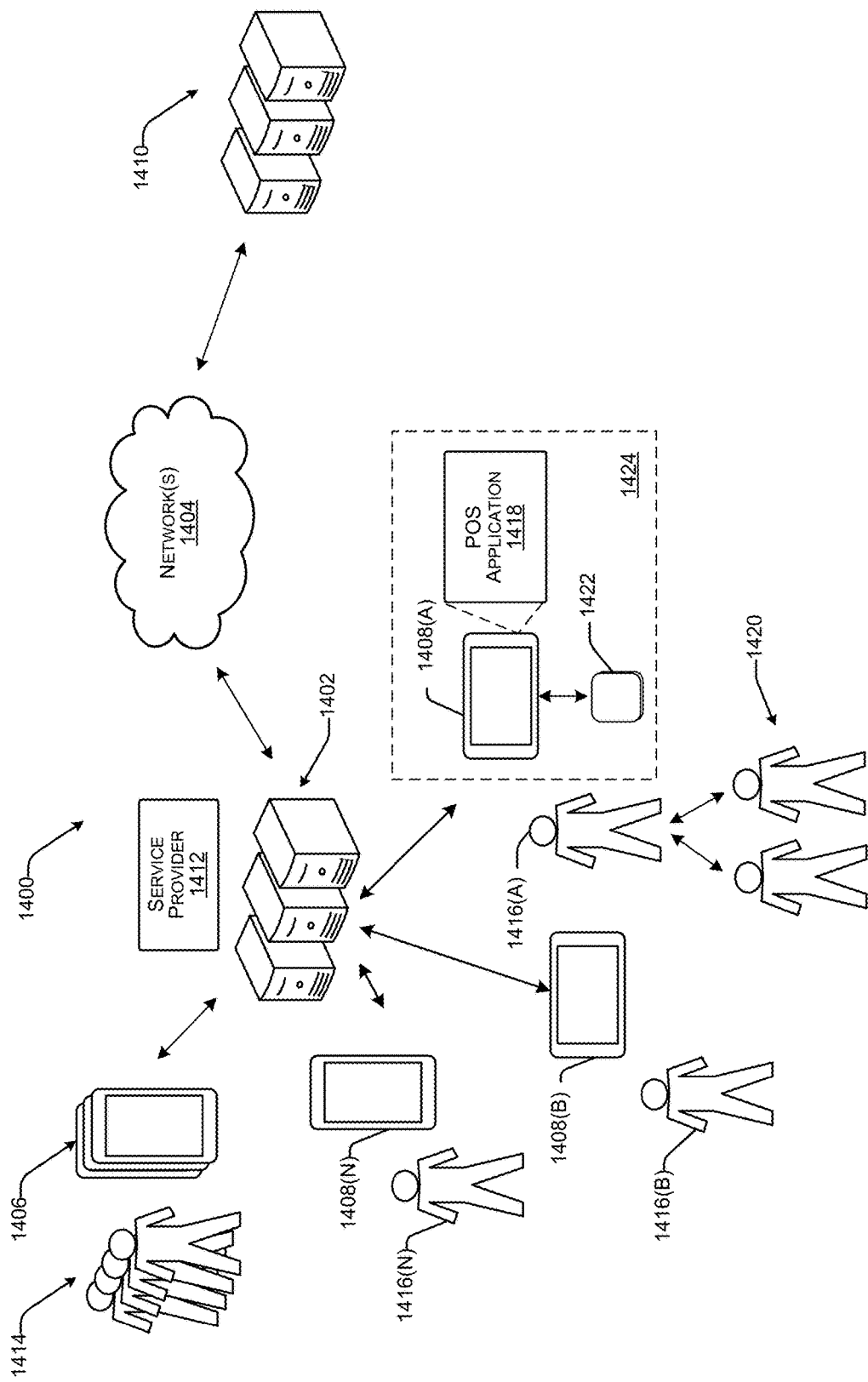
FIG. 14 illustrates an example environment in which the described techniques may be implemented.

FIG. 14 illustrates an example environment 1400. The environment 1400 includes server computing device(s) 1402 that can communicate over a network 1404 with user devices 1406 (which, in some examples can be merchant devices 1408 (individually, 1408(A)-1408(N))) and/or server computing device(s) 1410 associated with third-party service provider(s). The server computing device(s) 1402 can be associated with a service provider 1412 that can provide one or more services for the benefit of users 1414, as described below. Actions attributed to the service provider 1412 can be performed by the server computing device(s) 1402.

With reference to FIG. 1, the server computing device(s) 1402 can correspond to the server computing device(s) of payment service 108. Furthermore, the user devices 1406 can correspond to the POS device 104, or other merchant and/or customer devices. In at least one example, the service provider 1412 can correspond to the payment service 108 described above.

The environment 1400 can include a plurality of user devices 1406, as described above. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payors, payees, couriers, and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider 1412 or which can be an otherwise dedicated application. In at least one example, a user 1414 can interact with the user interface via touch input, spoken input, or any other type of input.

As described above, in at least one example, the users 1414 can include merchants 1416 (individually, 1416(A)-1416(N)). In an example, the merchants 1416 can operate respective merchant devices 1408, which can be user devices 1406 configured for use by merchants 1416. For the purpose of this discussion, a "merchant" can be any entity that offers items (e.g., goods or services) for purchase or other means of acquisition (e.g., rent, borrow, barter, etc.). The merchants 1416 can offer items for purchase or other means of acquisition via brick-and-mortar stores, mobile stores (e.g., pop-up shops, food trucks, etc.), online stores, combinations of the foregoing, and so forth. In some examples, at least some of the merchants 1416 can be associated with a same entity but can have different merchant locations and/or can have franchise/franchisee relationships. In additional or alternative examples, the merchants 1416 can be different merchants. That is, in at least one example, the merchant 1416(A) is a different merchant than the merchant 1416(B) and/or the merchant 1416(C).

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, employer identification numbers (EIN)s, lines of business (in some examples), inventories (or at least portions thereof), and/or the like. That is, the use of the term "different merchants" does not refer to a merchant with various merchant locations or franchise/franchisee relationships.

Each merchant device 1408 can have an instance of a POS application 1418 stored thereon. The POS application 1418 can configure the merchant device 1408 as a POS terminal, which enables the merchant 1416(A) to interact with one or more customers 1420. As described above, the users 1414 can include customers, such as the customers 1420 shown as interacting with the merchant 1416(A). For the purpose of this discussion, a "customer" can be any entity that acquires items from merchants. While only two customers 1420 are illustrated in FIG. 14, any number of customers 1420 can interact with the merchants 1416. Further, while FIG. 14 illustrates the customers 1420 interacting with the merchant 1416(A), the customers 1420 can interact with any of the merchants 1416.

In at least one example, interactions between the customers 1420 and the merchants 1416 that involve the exchange of funds (from the customers 1420) for items (from the merchants 1416) can be referred to as "POS transactions" and/or "transactions." In at least one example, the POS application 1418 can determine transaction data associated with the POS transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server computing device(s) 1402. Furthermore, the POS application 1418 can present a UI to enable the merchant 1416(A) to interact with the POS application 1418 and/or the service provider 1412 via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication-based payment instruments, and the like, as described below. In some examples, the reader device 1422 can read information from alternative payment instruments including, but not limited to, wristbands and the like.

The POS terminal can be paired with a reader device 1422 to comprise a POS system 1424. The reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments. The POS terminal may provide a rich user interface, communicate with the reader device 1422, and communicate with the server computing device(s) 1402, which can provide, among other services, a payment processing service. The service provider 1412 can communicate with server computing device(s) 1410, as described below. In this manner, the POS terminal and reader device 1422 may collectively process transaction(s) between the merchants 1416 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device).

While, the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card) and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server computing device(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, are not physically present at the POS such that payment data is required to be manually keyed in (e.g., by a merchant, customer, etc.), or payment data is required to be recalled from a card-on-file data store, to complete the transaction.

The POS system 1424, the server computing device(s) 1402, and/or the server computing device(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server computing device(s) 1402 over the network(s) 1404. The server computing device(s) 1402 may send the transaction data to the server computing device(s) 1410. As described above, in at least one example, the server computing device(s) 1410 can be associated with third-party service providers that provide payment services, including but not limited to, an acquirer bank, an issuer, and/or a card payment network (e.g., Mastercard®, VISA®, etc.)\

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1410 associated therewith) can send a fund transfer request to a server computing device of a card payment network (e.g., Mastercard®, VISA®, etc.) to determine whether the transaction is authorized or deficient. In at least one example, the service provider 1412 can serve as an acquirer and connect directly with the card payment network.

The card payment network (e.g., the server computing device(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1410 associated therewith) can make a determination as to whether the customer has the capacity to absorb the relevant charge associated with the payment transaction. In at least one example, the service provider 1412 can serve as an issuer and/or can partner with an issuer. The transaction is either approved or rejected by the issuer and/or the card payment network (e.g., the server computing device(s) 1410 associated therewith), and a payment authorization message is communicated from the issuer to the POS device via a path opposite of that described above, or via an alternate path.

As described above, the server computing device(s) 1410, which can be associated with payment service provider(s), may determine whether the transaction is authorized based on the transaction data, as well as information relating to parties to the transaction (e.g., the customer 1420 and/or the merchant 1416(A)). The server computing device(s) 1410 may send an authorization notification over the network(s) 1404 to the server computing device(s) 1402, which may send the authorization notification to the POS system 1424 over the network(s) 1404 to indicate whether the transaction is authorized. The server computing device(s) 1402 may also transmit additional information such as transaction identifiers to the POS system 1424. In one example, the server computing device(s) 1402 may include a merchant application and/or other functional components for communicating with the POS system 1424 and/or the server computing device(s) 1410 to authorize or decline transactions.

Based on the authentication notification that is received by the POS system 1424 from server computing device(s) 1410, the merchant 1416(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1412 can provide, among other services, payment processing services, inventory management services, catalog management services, business banking services, financing services, web-development services, payroll services, employee management services, appointment services, restaurant management services, order management services, delivery/courier services, peer-to-peer payment services, onboarding services, identity verification (IDV) services, and so on. In some examples, the users 1414 can access all of the services of the service provider 1412. In other examples, the users 1414 can have gradated access to the services, which can be based on risk tolerance, IDV outputs, subscriptions, and so on. In at least one example, access to such services can be availed to the merchants 1416 via the POS application 1418. In additional or alternative examples, each service can be associated with its own access point (e.g., application, web browser, etc.).

The service provider 1412 can offer payment processing services for processing payments on behalf of the merchants 1416, as described above. For example, the service provider 1412 can provision payment processing software, payment processing hardware and/or payment processing services to merchants 1416, as described above, to enable the merchants 1416 to receive payments from the customers 1420 when conducting POS transactions with the customers 1420. For instance, the service provider 1412 can enable the merchants 1416 to receive cash payments, payment card payments, and/or electronic payments from customers 1420 for POS transactions and the service provider 1412 can process transactions on behalf of the merchants 1416.

As the service provider 1412 processes transactions on behalf of the merchants 1416, the service provider 1412 can maintain accounts or balances for the merchants 1416 in one or more ledgers. For example, the service provider 1412 can analyze transaction data received for a transaction to determine an amount of funds owed to a merchant 1416(A) for the transaction. In at least one example, such an amount can be a total purchase price less fees charged by the service provider 1412 for providing the payment processing services. Based on determining the amount of funds owed to the merchant 1416(A), the service provider 1412 can deposit funds into an account of the merchant 1416(A). The account can have a stored balance, which can be managed by the service provider 1412. The account can be different from a conventional bank account at least because the stored balance is managed by a ledger of the service provider 1412 and the associated funds are accessible via various withdrawal channels including, but not limited to, scheduled deposit, same-day deposit, instant deposit, and a linked payment instrument.

A scheduled deposit can occur when the service provider 1412 transfers funds associated with a stored balance of the merchant 1416(A) to a bank account of the merchant 1416(A) that is held at a bank or other financial institution (e.g., associated with the server computing device(s) 1410). Scheduled deposits can occur at a prearranged time after a POS transaction is funded, which can be a business day after the POS transaction occurred, or sooner or later. In some examples, the merchant 1416(A) can access funds prior to a scheduled deposit. For instance, the merchant 1416(A) may have access to same-day deposits (e.g., wherein the service provider 1412 deposits funds from the stored balance to a linked bank account of the merchant on a same day as POS transaction, in some examples prior to the POS transaction being funded) or instant deposits (e.g., wherein the service provider 1412 deposits funds from the stored balance to a linked bank account of the merchant on demand, such as responsive to a request). Further, in at least one example, the merchant 1416(A) can have a payment instrument that is linked to the stored balance that enables the merchant to access the funds without first transferring the funds from the account managed by the service provider 1412 to the bank account of the merchant 1416(A).

In at least one example, the service provider 1412 may provide inventory management services. That is, the service provider 1412 may provide inventory tracking and reporting. Inventory management services may enable the merchant 1416(A) to access and manage a database storing data associated with a quantity of each item that the merchant 1416(A) has available (i.e., an inventory). Furthermore, in at least one example, the service provider 1412 can provide catalog management services to enable the merchant 1416(A) to maintain a catalog, which can be a database storing data associated with items that the merchant 1416(A) has available for acquisition (i.e., catalog management services). In at least one example, the catalog may include a plurality of data items and a data item of the plurality of data items may represent an item that the merchant 1461(A) has available for acquisition.

In at least one example, the service provider 1412 can provide business banking services, which allow the merchant 1416(A) to track deposits (from payment processing and/or other sources of funds) into an account of the merchant 1416(A), payroll payments from the account (e.g., payments to employees of the merchant 1416(A)), payments to other merchants (e.g., business-to-business) directly from the account or from a linked debit card, withdrawals made via scheduled deposit and/or instant deposit, etc. Furthermore, the business banking services can enable the merchant 1416(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1416 to visualize their cash flow to track their financial health, set aside money for upcoming obligations (e.g., savings), organize money around goals, etc.

In at least one example, the service provider 1412 can provide financing services and products, such as via business loans, consumer loans, fixed term loans, flexible term loans, and the like. In at least one example, the service provider 1412 can utilize one or more risk signals to determine whether to extend financing offers and/or terms associated with such financing offers.

In at least one example, the service provider 1412 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1412 can offer different types of capital loan products. For instance, in at least one example, the service provider 1412 can offer a daily repayment loan product, wherein a capital loan is repaid daily, for instance, from a portion of transactions processed by the payment processing service on behalf of the borrower. Additionally and/or alternatively, the service provider 1412 can offer a monthly repayment loan product, wherein a capital loan is repaid monthly, for instance, via a debit from a bank account linked to the payment processing service.

Additionally or alternatively, the service provider 1412 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1416. The service provider 1412 can generate the loan based at least in part on determining that the borrower purchased or intends to purchase the item from the merchant. The loan can be associated with a balance based on an actual purchase price of the item and the borrower can repay the loan overtime. In some examples, the borrower can repay the loan via installments, which can be paid via a stored balance associated with the service provider 1412. The service provider 1412 can offer specific financial products, such as payment instruments, tied specifically to the loan products.

For example, in one implementation, the server provider 1412 associate capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1412 can provide web-development services, which enable users 1414 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presence, such as social media posts for example.

Furthermore, the service provider 1412 can provide payroll services to enable employers to pay employees for work performed on behalf of employers. In at least one example, the service provider 1412 can receive data that includes time worked by an employee, sales made by the employee, gratuities received by the employee, and so forth. Based on such data, the service provider 1412 can make payroll payments to employee(s) on behalf of an employer via the payroll service. For instance, the service provider 1412 can facilitate the transfer of a total amount to be paid out for the payroll of an employee from the bank of the employer to the bank of the service provider 1412 to be used to make payroll payments. In at least one example, when the funds have been received at the bank of the service provider 1412, the service provider 1412 can pay the employee, such as by check or direct deposit, often a day, a week, or more after when the work was actually performed by the employee. In additional or alternative examples, the service provider 1412 can enable employee(s) to receive payments via same-day or instant deposit based at least in part on risk and/or reliability analyses performed by the service provider 1412.

Moreover, in at least one example, the service provider 1412 can provide employee management services for managing schedules of employees. Further, the service provider 1412 can provide appointment services for enabling users 1414 to set schedules for scheduling appointments and/or users 1414 to schedule appointments.

In some examples, the service provider 1412 can provide restaurant management services to enable users 1414 to make and/or manage reservations, to monitor front-of-house and/or back-of-house operations, and so on. In at least one example, the service provider 1412 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

As described above, the service provider 1412 can provide courier services, wherein couriers can travel between multiple locations to provide delivery services, photography services, etc. Couriers can be users 1414 who can travel between locations to perform services for a requesting user 1414 (e.g., deliver items, capture images, etc.). In some examples, the courier can receive compensation from the service provider 1412. The courier can employ one or more vehicles, such as automobiles, bicycles, scooters, motorcycles, buses, airplanes, helicopters, boats, skateboards, etc.

Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations.

In at least one example, the service provider 1412 can provide a peer-to-peer payment service that enables peer-to-peer payments between two or more users 1414. In at least one example, the service provider 1412 can communicate with instances of a payment application (or other access point) installed on devices 1406 configured for operation by users 1414. In an example, an instance of the payment application executing on a first device operated by a payor can send a request to the service provider 1412 to transfer an amount of funds (e.g., fiat currency or non-fiat currency such as cryptocurrency, securities, and related assets) from an account of the payor to an account of a payee (e.g., a peer-to-peer payment). The service provider 1412 can facilitate the transfer and can send a notification to an instance of the payment application executing on a second mobile device operated by the payee that the transfer is in process (or has been completed). In some examples, the service provider 1412 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 1414 may be new to the service provider 1412 such that the user 1414 that has not registered (e.g., subscribed to receive access to one or more services offered by the service provider) with the service provider 1412. The service provider 1412 can offer onboarding services for registering a potential user 1414 with the service provider 1412. In some examples, onboarding can involve presenting various questions, prompts, and the like to a potential user 1414 to obtain information that can be used to generate a profile for the potential user 1414. Responsive to the potential user 1414 providing all necessary information, the potential user 1414 can be onboarded to the service provider 1412.

The service provider 1412 can be associated with IDV services, which can be used by the service provider 1412 for compliance purposes and/or can be offered as a service, for instance to third-party service providers (e.g., associated with the server computing device(s) 1410). That is, the service provider 1412 can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider 1412 can perform services for determining whether identifying information provided by a user 1414 accurately identifies the customer (or potential customer) (i.e., Is the customer who they say they are?).

The service provider 1412 is capable of providing additional or alternative services and the services described above are offered as a sampling of services. In at least one example, the service provider 1412 can exchange data with the server computing device(s) 1410 associated with third-party service providers. Such third-party service providers can provide information that enables the service provider 1412 to provide services, such as those described above. In additional or alternative examples, such third-party service providers can access services of the service provider 1412. That is, in some examples, the third-party service providers can be subscribers, or otherwise access, services of the service provider 1412.

Techniques described herein can be configured to operate in both real-time/online and offline modes. "Online" modes refer to modes when devices are capable of communicating with the service provider 1412 (e.g., the server computing device(s) 1402) and/or the server computing device(s) 1410 via the network(s) 1404. In some examples, the merchant device(s) 1408 are not capable of connecting with the service provider 1412 (e.g., the server computing device(s) 1402) and/or the server computing device(s) 1410, due to a network connectivity issue, for example. In additional or alternative examples, the server computing device(s) 1402 are not capable of communicating with the server computing device(s) 1410 due to network connectivity issue, for example. In such examples, devices may operate in "offline" mode where at least some payment data is stored (e.g., on the merchant device(s) 1408) and/or the server computing device(s) 1402 until connectivity is restored and the payment data can be transmitted to the server computing device(s) 1402 and/or the server computing device(s) 1410 for processing.

Figure 15:
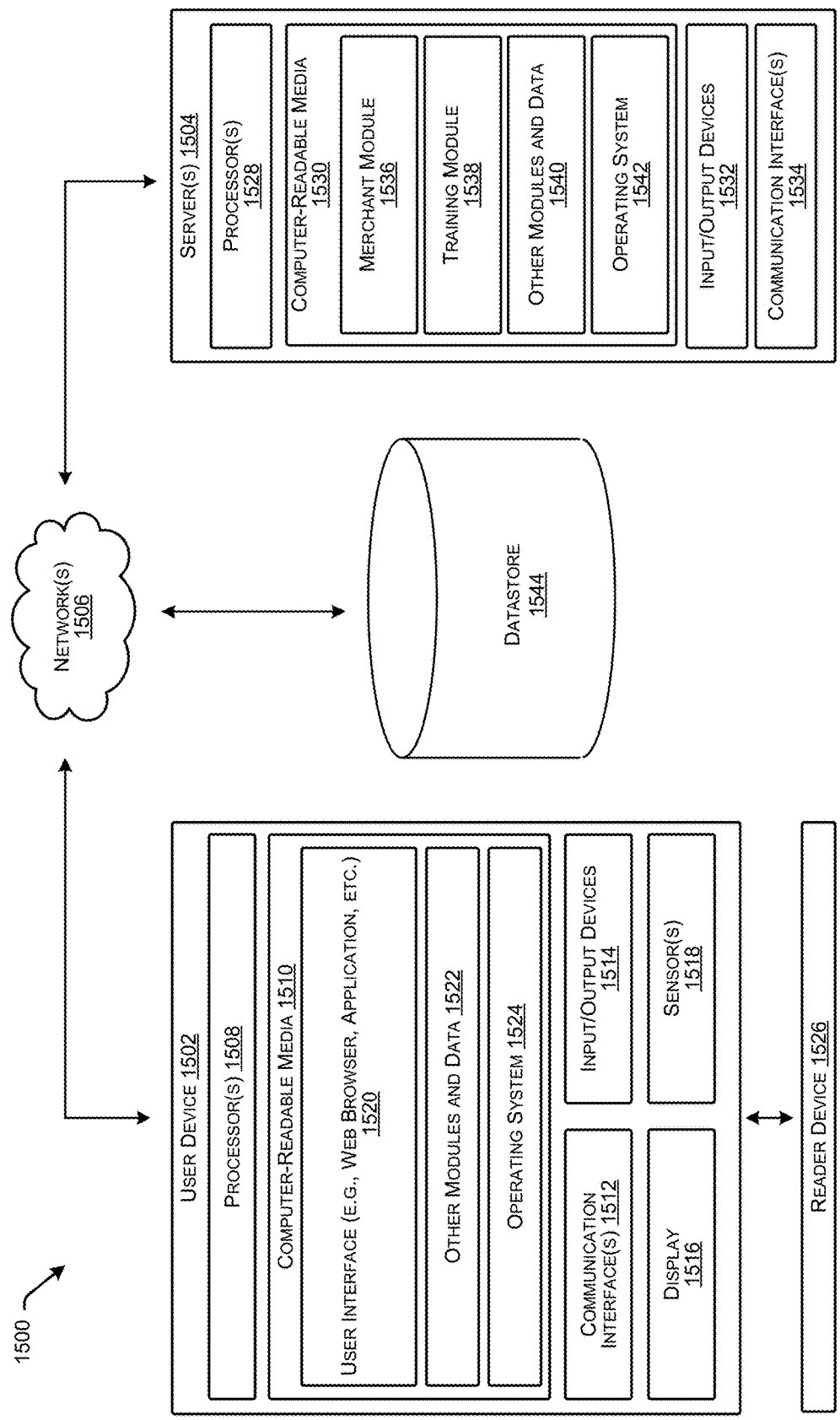
FIG. 15 illustrates example components that may implement the described techniques.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 14. For example, the user device 1502 can correspond to any one of the merchant computing device 104 the photographer courier computing device 106, or the image capturing device 108, as described above with reference to FIG. 1.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1512, one or more input/output (I/O) devices 1514, a display 1516, and sensor(s) 1518.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, modules or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider 1412 associated with the server(s) 1504, or which can be an otherwise dedicated application. In some examples, the user interface 1520 can be the ecommerce user interface 124, the courier user interface 128, or the image capturing user interface 130. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, to determine context or intent of the user, which may be treated in a manner similar to "direct" user input.

Depending on the type of the user device 1502, the computer-readable media 1510 can also optionally include other functional components and data, such as other modules and data 1522, which can include programs, drivers, etc., and the data used or generated by the functional components. In some instances, the other modules and data 1522 may comprise the same functionality and data as that described above with reference to the POS device 104 and other client devices. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling basic user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtually reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone/headphone port, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1526 may also include a biometric sensor to receive and process biometric characteristics and process them as payment instruments, given that such biometric characteristics are registered with the payment service system and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more modules and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one module for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used. In at least one example, the server(s) 1504 can correspond to the server computing device(s) 102 described above with reference to FIG. 1.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units, and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program modules, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider 1412 and/or payment processing service. Functional components stored in the computer-readable media 1530 can optionally include a merchant module 1536, a training module 1538, and one or more other modules and data 1540.

The merchant module 1536 can be configured to receive transaction data from POS systems, such as the POS system 1424 described above with reference to FIG. 14. The merchant module 1536 can transmit requests (e.g., authorization, capture, settlement, etc.) to payment service server computing device(s) to facilitate POS transactions between merchants and customers. The merchant module 1536 can communicate the successes or failures of the POS transactions to the POS systems. In some examples, the payment processing module 116, described above, and the merchant module 1536 can perform the same or similar functions.

The training module 1538 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The one or more other modules and data 1540 can include programs, drivers, etc., and the data used or generated by the functional components. Further, the server(s) 1504 can include many other logical, programmatic and physical components, of which those described above are merely examples that are related to the discussion herein. In some instances, the other modules and data 1522 may comprise the same functionality and data as that described above with reference to the payment service 108, such as the components and data described in detail with reference to each of FIGS. 1A, 1B, and 2.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In some examples, a module may include one or more application programming interfaces (APIs) to perform some or all of its functionality (e.g., operations). In additional and/or alternative examples, the module(s) may be implemented as computer-readable instructions, various data structures, and so forth via at least one processing unit to configure the computing device(s) described herein to execute instructions and to perform operations as described herein.

The computer-readable media 1530 can additionally include an operating system 1542 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joy-stick, keyboard, mouse, touch screen, biometric or sensory input devices, etc.), audio speakers, connection ports and so forth.

In at least one example, the system 1500 can include a datastore 1544 that can be configured to store data that is accessible, manageable, and updatable. In some examples, the datastore 1544 can be integrated with the user device 1502 and/or the server(s) 1504. In other examples, as shown in FIG. 15, the datastore 1544 can be located remotely from the server(s) 1504 and can be accessible to the server(s) 1504. The datastore 1544 can comprise multiple databases and/or servers connected locally and/or remotely via the network(s) 1506.

In at least one example, the datastore 1544 can store user profiles, which can include merchant profiles, customer profiles, courier profiles, and so on, as described above. Furthermore, in at least one example, the datastore 1544 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1544 can store additional or alternative types of data (e.g., image(s) 120, etc.) as described herein.

In at least one example, the datastore 1544 can be associated with a brand asset database, which can store information associated with brand assets associated with merchants. A brand asset can be a logo (e.g., text logo, graphic logo, favicon, etc.), a font, a color, an image, an icon, a button style, effects, spacing, and the like used in association with a brand of the merchant. In some examples, a brand asset can be associated with multiple content items, which can be applicable to different end users and/or intended viewers. For instance, a brand asset corresponding to a logo can be associated with a logo that is presented to customers and a logo that is presented to merchants. In some examples, image(s) captured via techniques described herein can be added to the brand asset database and/or data associated with the brand asset database can be used for informing guidance as described herein.

Figure 16:
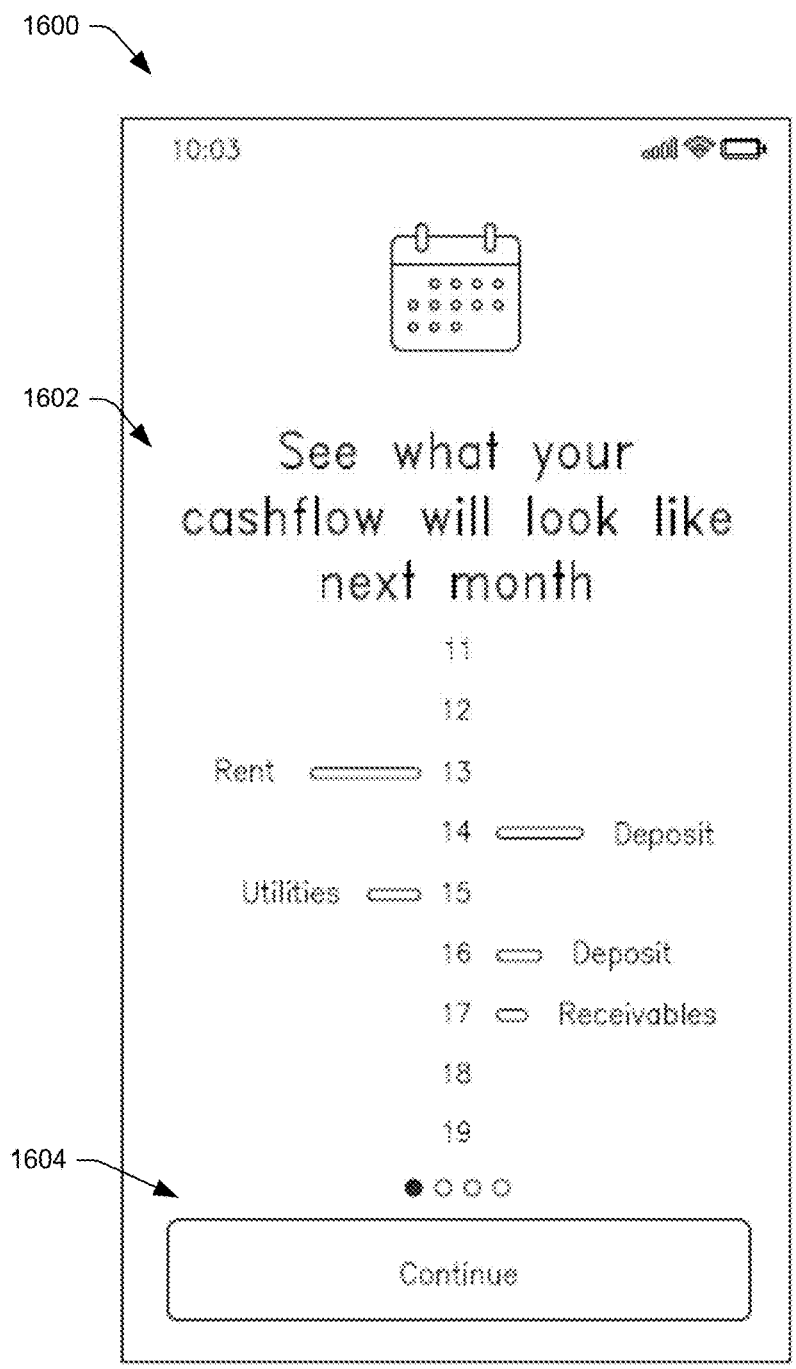
FIG. 16 illustrates an example UI that the payment service may provide to the POS device or other client device for providing, to a merchant or other user, prediction data associated with an account of the merchant or other user. In this example, the UI introduces the concept of predicting cash flow in a following.

FIG. 16 illustrates an example UI 1600 that the payment service 108 may provide to the POS device 104 or other client device for providing, to a merchant 102(1) or other user, prediction data associated with an account of the merchant 102(1) or other user. In this example, the UI introduces the concept of predicting cash flow in a following month. That is, this figure, along with FIGS. 17-19, may comprise a series of "onboarding" UIs intended to introduce concepts enabled by application provided by the payment service. Furthermore, while the following FIGS. 16-27 are described with reference to cashflow, it is to be appreciated that the UIs may also track asset value; that is, the value of items in addition to cash (e.g., securities, loan amounts, stocks, etc.).

As illustrated, the UI 1600 includes an area 1602 informing the user that the application is configured to make predictions regarding an account of the merchant or other user such that the merchant or other user is able to "see what [their] cashflow will look like next month." In addition, the area 1602 may include a listing of one or more days of the month (e.g., days 11 through 18 in this example) along with predicted expenses and income for one or more of the days. For example, the area 1602 illustrates, in this example, that an expense corresponding to rent is coming due on the thirteenth of the impending month and an expense corresponding to utilities is coming due on the fifteenth of the month. Furthermore, the UI may include a representation of a relative size of the expense. For example, the UI 1600 includes, adjacent the identifier for the thirteenth of the month, a bar to the left (indicating an expense) having a size that is greater than a size of a bar to the left of the identifier for the fifteenth of the month. This may indicate that the expense corresponding to "rent" on the thirteenth is greater than the expense corresponding to the "utilities" due on the fifteenth.

Similarly, the area 1602 of the UI 1600 indicates, in this example, that the account is predicted to receive respective deposits on the fourteenth and sixteenth of the impending month, as well as income from receivables on the seventeenth of the month. Furthermore, the UI 1600 may include a visual representation of the income, such as a bar to the right side of the identifier of the corresponding day of the month. Again, the visual identifiers, such as size, color, length, etc., of the bar may correspond (relatively) to the size of the income. In this example, for instance, the first deposit is predicted to be largest deposit of the three illustrated incomes, while the receivables income is predicted to be the smallest. Finally, the UI 1600 may include an icon 1604 that, when selected, cause the underlying application to transition to a UI 1700, which may continue the informative onboarding process. Of course, while this example illustrates the use of linear visual bars for representing income and expenses, and their respective sizes, it is to be appreciated that other presentations may be used (e.g., pie charts, numbers, etc.).

Figure 17:
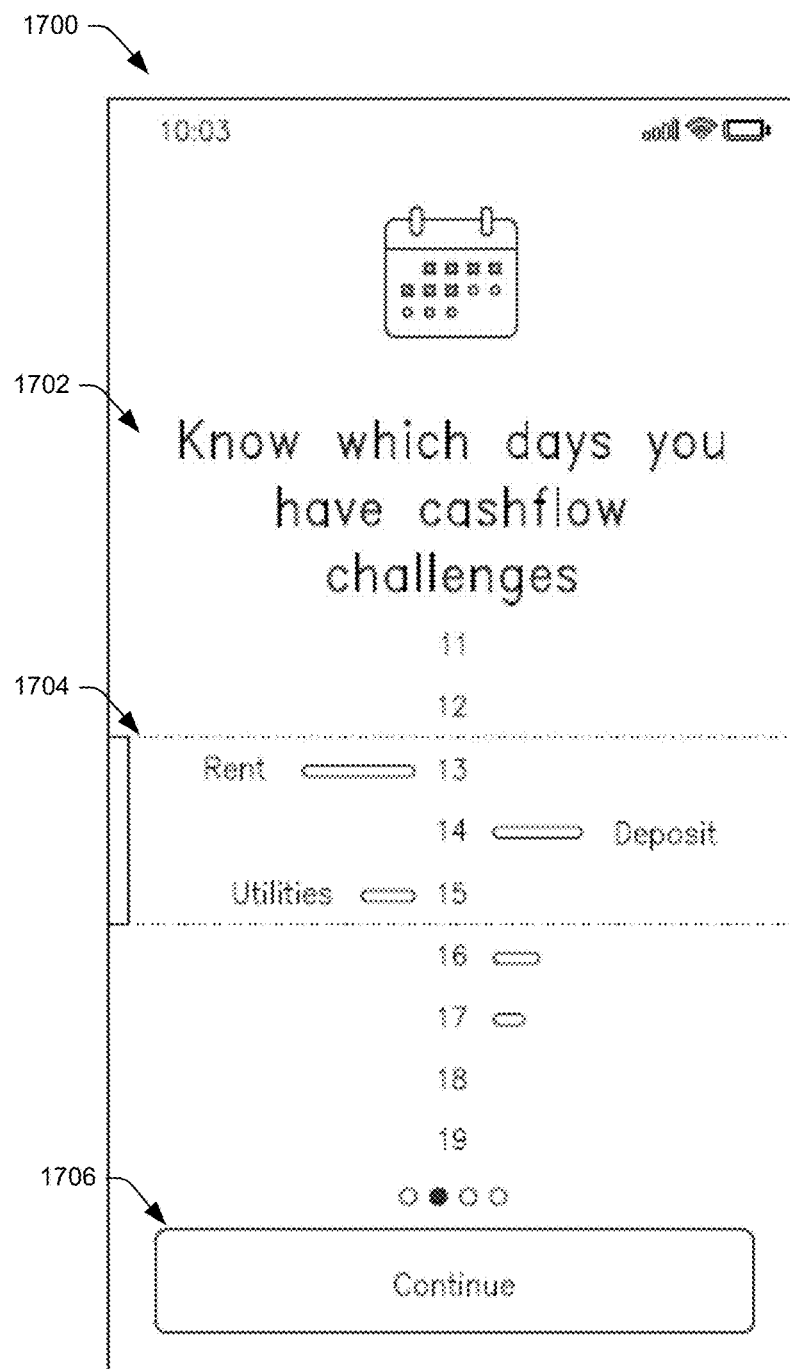
FIG. 17 illustrates an example UI that the payment service may provide to the POS device or other client device for providing, to a merchant or other user, prediction data associated with an account of the merchant or other user. In this example, the UI introduces the concept of highlighting days within the following month that may have cashflow challenges.

FIG. 17 illustrates the example UI 1700 that the payment service (e.g., the application provided by the payment service 108) may provide to the POS device 104 in response to the merchant 102(1) or other user selecting the "continue" icon 1604 from the UI 1600. In this example, the UI 1700 includes an area 1702 that introduces the concept of highlighting days within the following month that may have cashflow challenges (or other cashflow abnormalities such as cash surplus or unintended expenses). In some implementations, area 1702 may correspond to the events that are capable of triggering a float/reserve circumstance as discussed in FIGS. 9-13. For example, the area 1702 includes a visual representation 1704 of a portion of the upcoming month for which the balance of the merchant or other user account may be less than a reserve amount, may have a negative balance, or the like. In this example, the visual representation 1704 comprises a bounding box surrounding those days of the upcoming month that the account is predicted to have a negative balance. Of course, while FIG. 17 illustrates a bounding box, it is to be appreciated that the visual representation 1704 may comprise any other type of visual indicia configured to signal to the merchant or other user that the account is predicted to be negative (or less than a reserve amount) at a specified future time (e.g., one or more days of the forthcoming month). Finally, the UI 1700 includes an icon 1706 that, when selected, continues the sequence of onboarding UIs.

Figure 18:
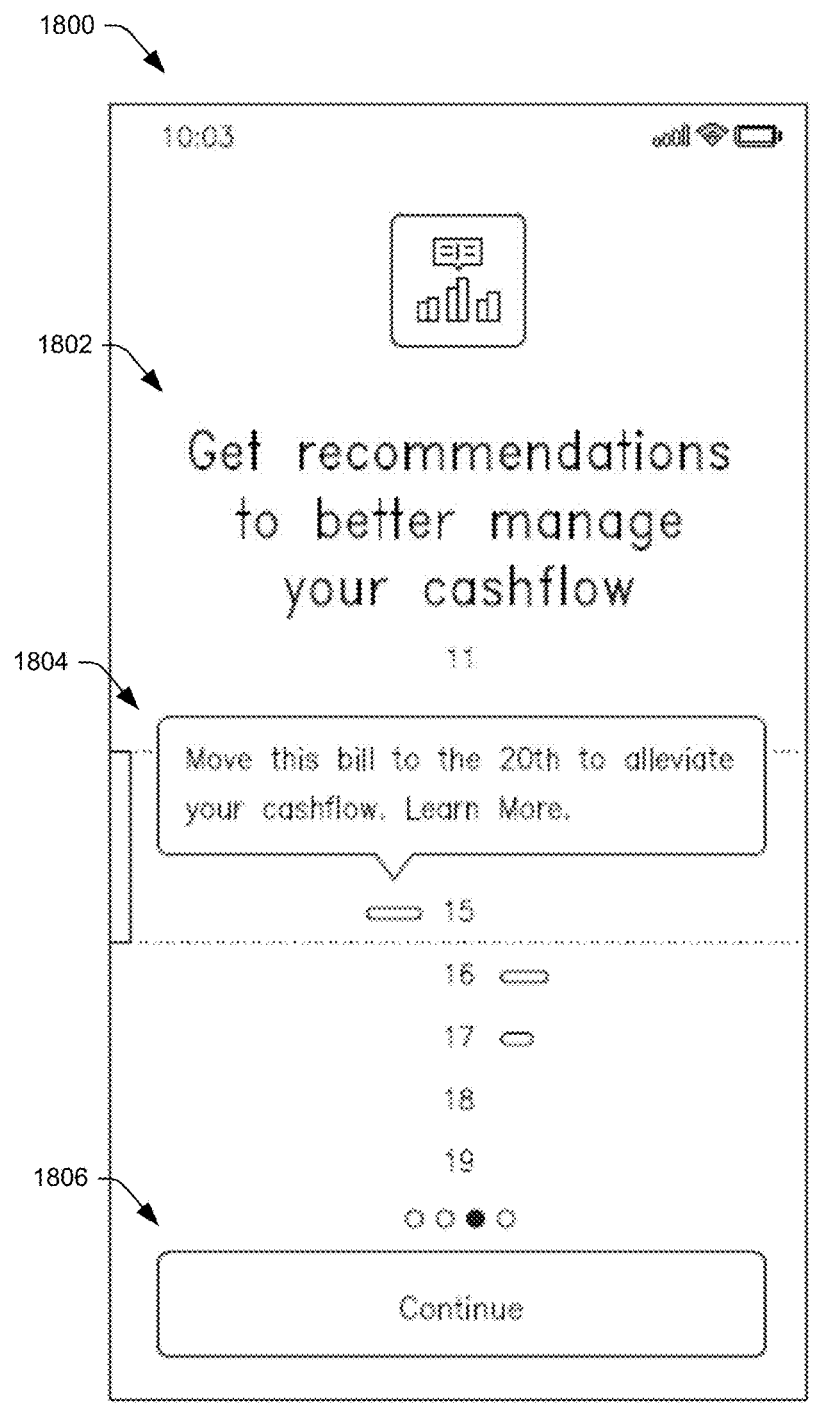
FIG. 18 illustrates an example UI that the payment service may provide to the POS device or other client device for providing, to a merchant or other user, prediction data associated with an account of the merchant or other user. In this example, the UI introduces the concept of providing recommendations to the merchant or other user for managing any predicted cashflow difficulties.

FIG. 18 illustrates an example UI 1800 that the payment service 108 may provide to the POS device 104 or other client device in response to the merchant 102(1) or other user selecting the icon 1706. In this example, the UI 1800 includes an area 1802 that introduces the concept of providing recommendations to the merchant or other user for managing any predicted cashflow difficulties. As illustrated, the area 1802 includes a recommendation 1804 for handling the predicted cashflow challenge discussed above with reference to FIG. 17. In this example, the recommendation 1804 comprises a recommendation to move a bill to a different day of the month, such as a later day in the month when the account is predicted to have a balance that can cover the predicted expense. In some instances, the recommendation 1804 may be selectable to cause action of the recommendation. For example, the recommendation 1804 may comprise a link that, when selected, causes the POS device 104 or other device to present a UI for requesting to move the expense to a later date. Of course, while FIG. 18 illustrates an example recommendation 1804, it is to be appreciated that the recommendation 1804 may take any other form, such as a recommendation to attempt to lessen the expense, a recommendation to cancel a service or item associated with the expense, a recommendation to take a "cash boost" or "float" (as described above), or the like. Finally, the UI 1800 includes an icon 1806 that, when selected, continues the sequence of onboarding UIs.

Figure 19:
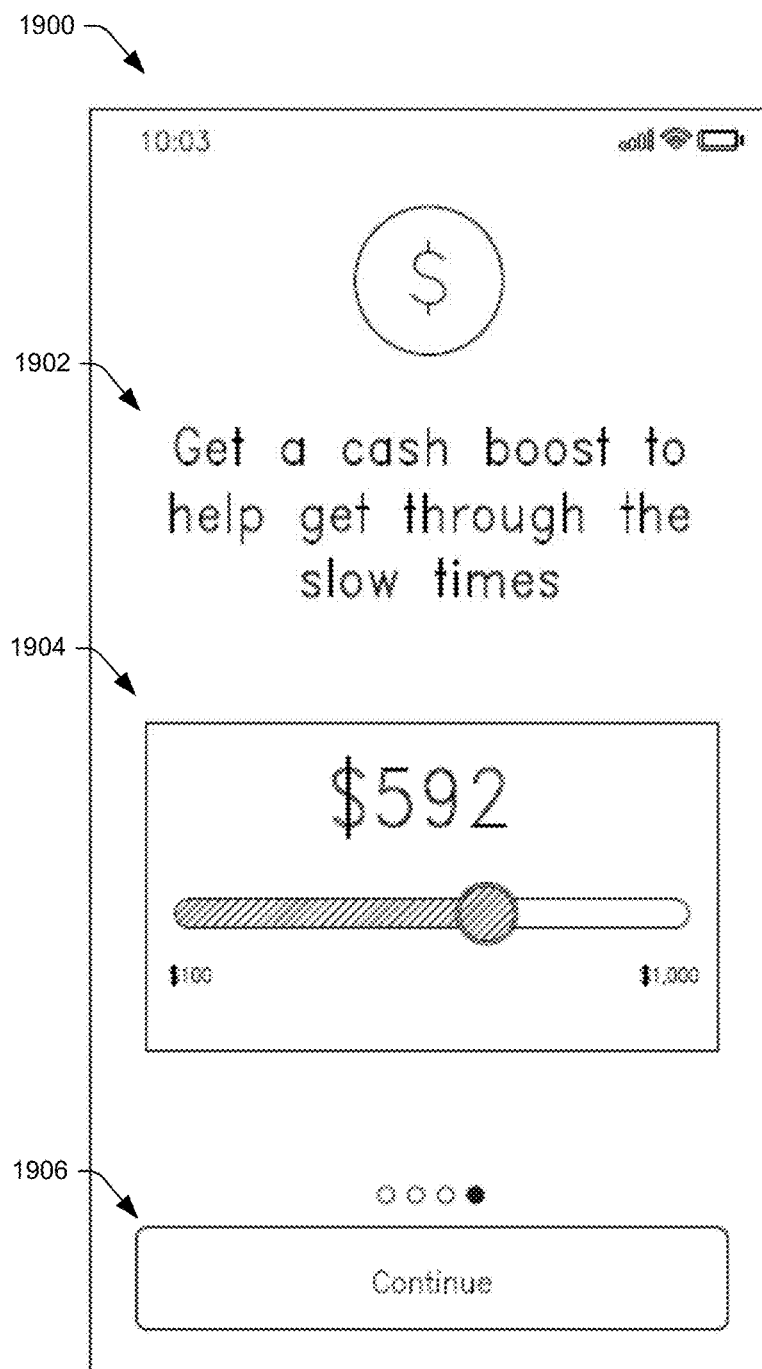
FIG. 19 illustrates an example UI that the payment service may provide to the POS device or other client device for providing, to a merchant or other user, prediction data associated with an account of the merchant or other user. In this example, the UI introduces the concept of providing a float or "cash boost" to help with a predicted cashflow challenge.

FIG. 19 illustrates an example UI 19800 that the payment service 108 may provide to the POS device 104 or other client device in response to the merchant 102(1) or other user selecting the icon 1806. In this example, the UI 1900 includes an area 1902 indicating that the merchant 102(1) or other user may request a cash boost (i.e., a float) to handle difficulty associated with a predicted cashflow shortage (e.g., based on a prediction that sales/revenue will be low, based on a prediction that a merchant will need to acquire additional inventory for an impending busy season, or the like). The UI 1900 may also include a UI element 1904 for specifying an amount of a requested cash boost, as well as for submitting a request for the cash boost. In this example, the UI element 1904 comprises a slider element that the merchant 102(1) or other user may move left or right to request a lesser or greater cash boost, respectively. Of course, in other instances the UI element 1904 may additionally, or alternatively, include a text box in which a user may enter a requested amount, a drop-down menu in which the user may specify a requested amount, and/or the like. Finally, the UI 1900 includes an icon 1906 that, when selected, may end the sequence of onboarding UIs and result in the display of UIs for configuring the application for a particular merchant or other type of user.

Figure 20:
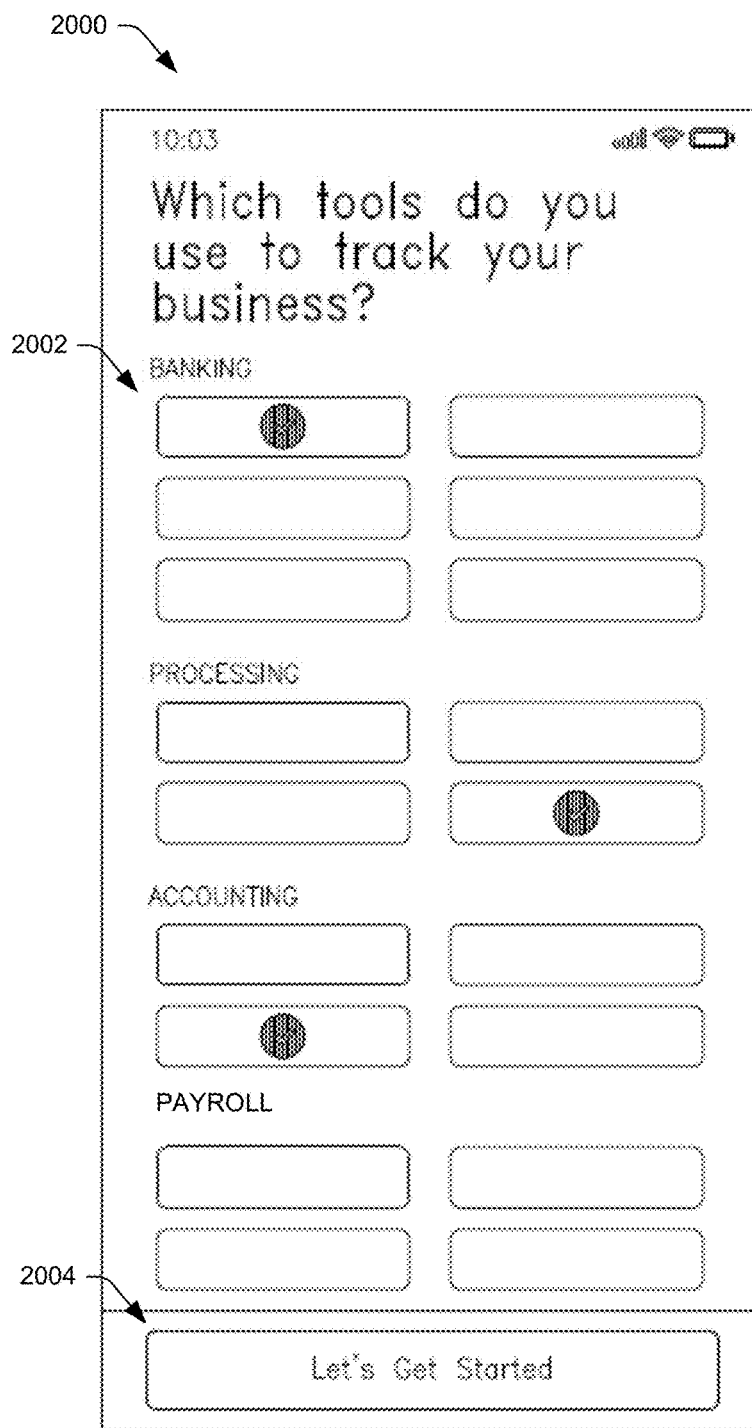
FIG. 20 illustrates an example UI that the payment service may provide to the POS device or other client device for aggregating information from one or more services and/or tools associated with the merchant or other user. The payment service (e.g., the example application provided by the payment service) may use information received from these tools and/or services for predicting an account balance, a cashflow, and/or the like for the merchant or other user.

FIG. 20 illustrates an example UI 2000 that the payment service may provide to the POS device 104 or other client device after the merchant 102(1) or other user has finished viewing the onboarding UIs discussed above with reference to FIGS. 16-19. In this example, the UI 2000 may comprise a UI for aggregating information from one or more services and/or tools associated with the merchant 102(1) or other user. The payment service 108 (e.g., the example application provided by the payment service) may use information received from these tools and/or services for predicting an account balance, a cashflow, and/or the like for the merchant or other user. For example, the UI 2000 may an area 2002 that enables the merchant 102(1) or other user to specify one or more financial tools that the merchant 102(1) or other user employs. For example, the area 2002 may enable the merchant or other user to specify one or more of their banking accounts they utilize, credit-card processors, payroll services, accounting services, and/or the like. In some instances, the merchant 102(1) or other user grants access to these tools and/or services to the payment service 108 to enable the payment service 108 to generate prediction data for predicting when an account(s) of the merchant or other user will experience cashflow difficulty, when it will have surplus funds, and/or the like. In some instances, the payment service 108 requests access to specific tools/services (as opposed to all) based on a profile of the merchant 102(1). The payment service 108 applies intelligence on payment history and financial behavior of the merchant 102(1) to request targeted data and minimize the friction associated with data entry. Finally, the UI 2000 includes an icon 2004 that, when selected, cause the payment service 108 to aggregate information associated with the specified tools and/or services of the merchant or other user for generating the prediction data.

Figure 21:
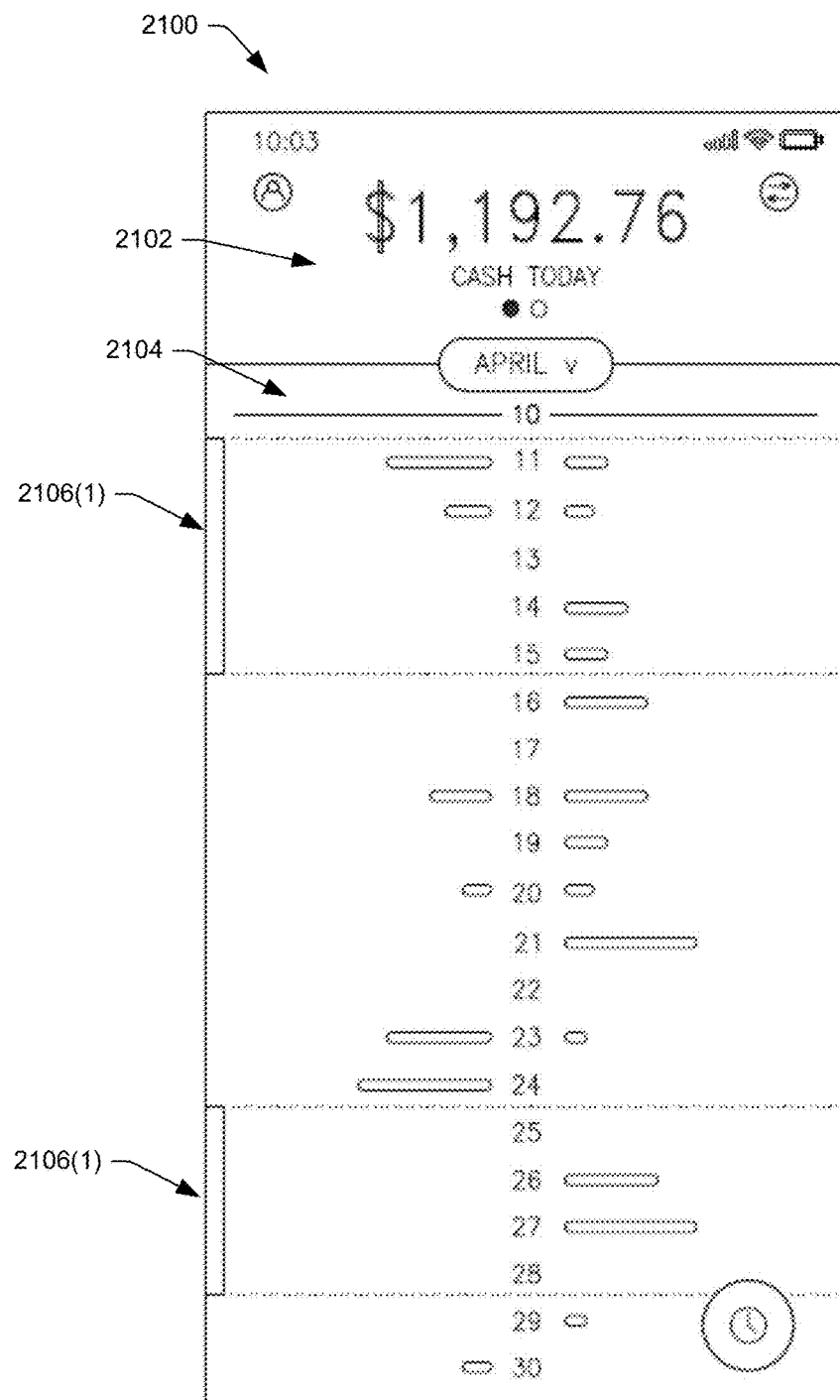
FIG. 21 illustrates an example UI that the payment service may provide to the POS device or other client device after the payment service has received information regarding the merchant or other user account and generated prediction data that is tailored to the merchant or other user.

FIG. 21 illustrates an example UI 2100 that the payment service may provide to the POS device or other client device after the merchant or other user has indicated (e.g., via the UI 2000) one or more tools and/or services used by the merchant or the other user. In this example, the UI 2100 includes an area 2102 indicating a current balance of the account (in this example, $1,192.76) and an area 2104 indicating expected/predicted expenses and income for the upcoming month. As described above, in the illustrated example, the area 2104 may indicate predicted expenses on the left and predicted income on the right, with some or all of this information being generated based on accessing information from the tools and/or services specified by the merchant or other user via the UI 2000. Furthermore, each indicated expense and/or income may include a visual representation (e.g., bar) indicating a day on which the expense or income is predicted to occur at and a relative size of the predicted expense or income. Further, the UI 2100 may include additional information regarding the account, such as the reserve amount set previously set by the user (e.g., as discussed above with reference to the UI 900, etc.).

In addition, the UI 2100 may include one or more respective visual representations of day(s) of the upcoming month that the merchant or other user is predicted to experience cashflow difficulty. For example, the UI 2100 includes, in this instance, a first visual representation 2106(1) (e.g., a bounding box), indicating that the merchant or other is predicted to have a negative account balance between April 11 and 15, as well as a second visual representation 2106(2) indicating that the merchant or other user is also predicted to have a negative account balance between April 25-28.

Figure 22:
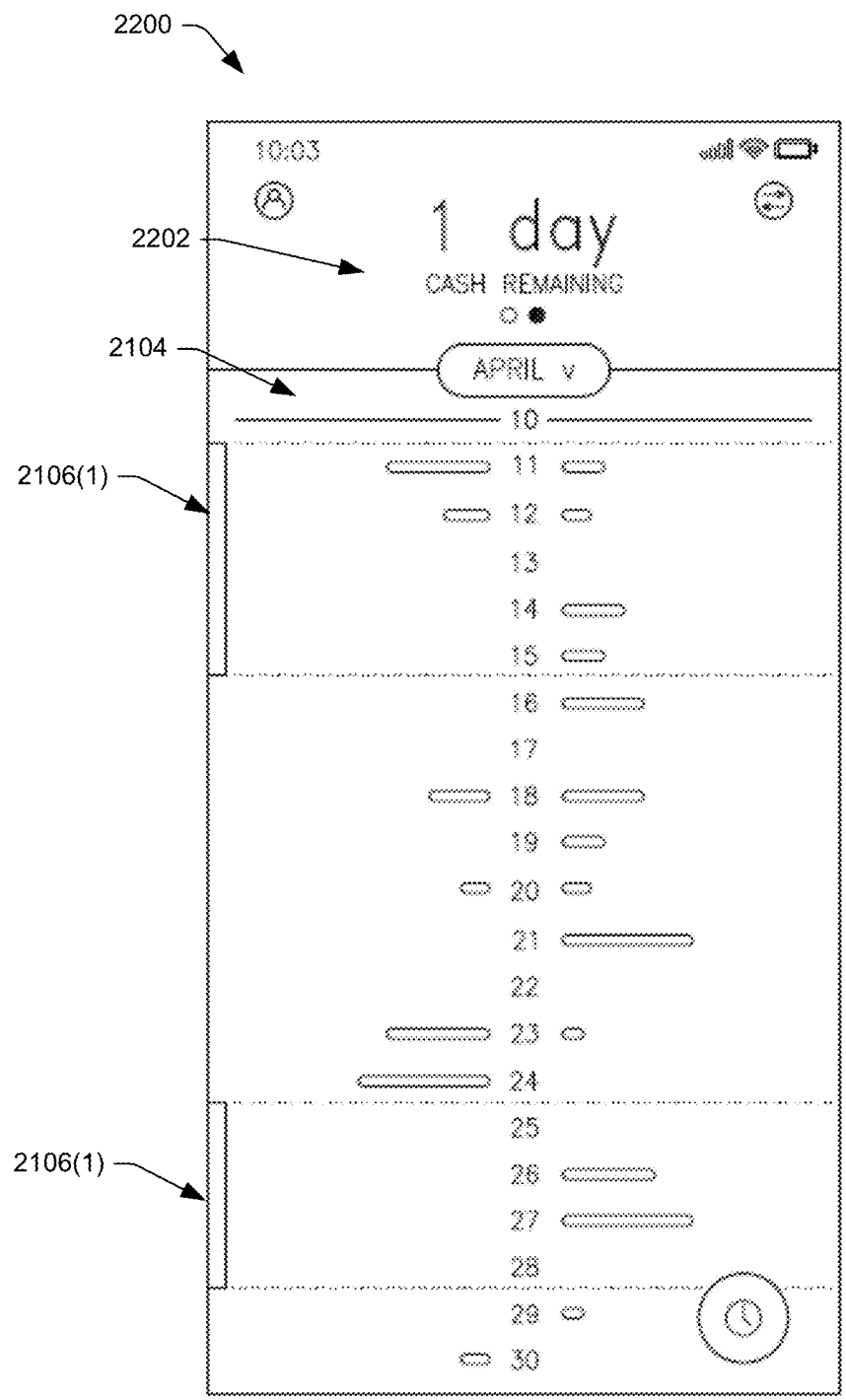
FIG. 22 illustrates an example UI where a user of the UI of FIG. 21 has provided an input to view an amount of time until the account is predicted to run out of funds.

FIG. 22 illustrates an example UI 2200 where a user of the UI 2100 has provided an input to view an amount of time until the account is predicted to run out of funds, in one example. In another example, the UI 2100 may indicate an amount of time until the account is predicted to fall below a reserve amount previously set for the account, such as the reserve amount set using the UI 900 discussed above. In these latter examples, the application generating the UI 2200 may automatically identify the reserve amount previously set by the user and may use the prediction data to determine when the account is predicted to fall below the reserve amount.

For example, the merchant 102(1) or other user may provide a touch input (e.g., a swipe left) resulting in the presentation of the UI 2200. As illustrated, the UI 2200 may include an area 2202 indicating a predicted number of days until the account balance is predicted to be negative (or less than a threshold amount, such as a previously set reserve amount). In this example, the UI 2200 also includes the area 2104 indicating predicted expenses on the left and predicted income on the right, as well as the visual representations 2106(1) and 2106(2) indicating day(s) of predicted cash flow difficulty.

Figure 23:
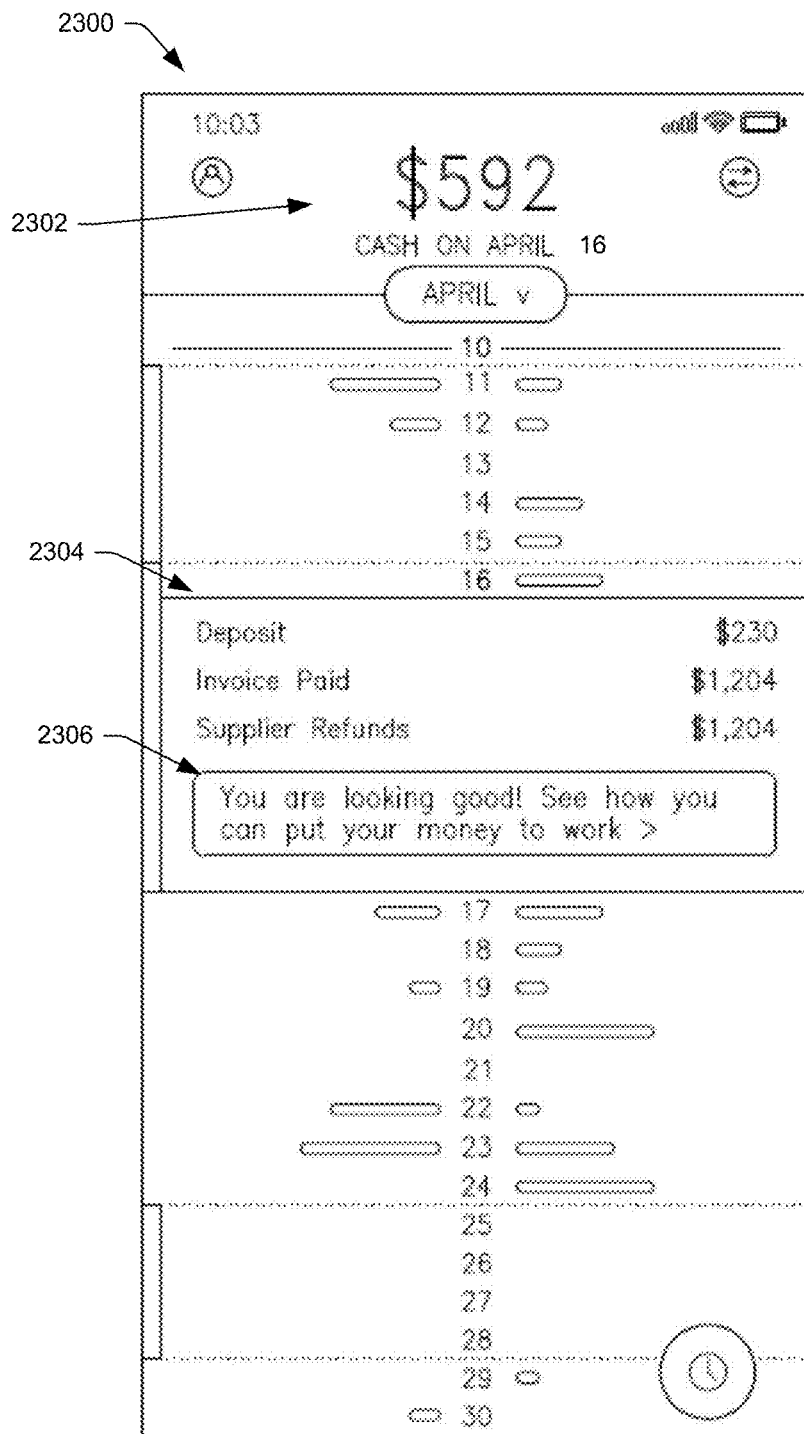
FIG. 23 illustrates an example UI after a user has selected, from the UIs of FIG. 21 or 22, to view details associated with a particular day of the following month. In this example, the account is predicted to have surplus funds on the selected day and, thus, the UI includes an icon that is selectable to take action with respect to the surplus funds.

FIG. 23 illustrates an example UI 2300 after a user has selected, from the UI 2100 or 2200, to view details associated with a particular day of the following month. In this example, the merchant 102(1) or other user has requested to view details associated with a day (April 16) on which the account is predicted to have a positive balance. As illustrated, the UI 2300 includes an area 2302 indicating a predicted balance on the selected day (here, $592), as well as an area 2304 showing details associated with the account of the user on the selected day. These details may include, for example, expected income and expenses on the selected day. In this example, the area 2304 indicates that the payment service 108 predicts that the account will receive income corresponding a deposit, a paid invoice, and supplier refunds on the selected day.

Furthermore, given that the account is predicted to have a positive balance (and, potentially, funds designated as surplus, as described above), the UI 2300 may include an icon 2306 that, when selected, causes one or more actions to be performed for or recommended to a user with respect to these funds. That is, selection of the link 2306 may result in one or more recommendations for the user to take with respect to the funds in the account (e.g., a recommendation to move them to a higher-yield account, etc.) and one or more actions being performed (e.g., actually causing a transfer of some or all of the funds to a higher-yield account).

In some instances, the UI 2300 may additionally, alternatively, display an amount of surplus funds in the account; that is, an amount of funds over a threshold previously set by the user. For example, the user may have used the UI 900, discussed above, to set the reserve amount, and the application generating the UI 2300 may utilize this reserve amount to determine the amount of surplus funds in the account.

Figure 24:

FIG. 24 illustrates an example UI 2400 after the user has selected the icon 2306. As illustrated, the UI 2400 may enable the user to perform actions such as "make a big payment", save for an "unexpected expense", "buy new equipment", "prepare for taxes", or the like. In response to selecting one or more of these options, the payment service 108 (e.g., the underlying application provided by the payment service 108) may initiate a workflow for performing the requested action.

In some instance, the UI 2400 may be customized to the merchant or other user based on information associated with the merchant or other user and known to the payment service 108. For example, the UI 2400 may take into account information such as a type of the merchant or other user, historical sales, pending sales, current inventory, previously stated goals, or the like. In some instances, this information may be specified by the merchant or may be determined using information associated with similarly situated merchants or other users.

Figure 25:
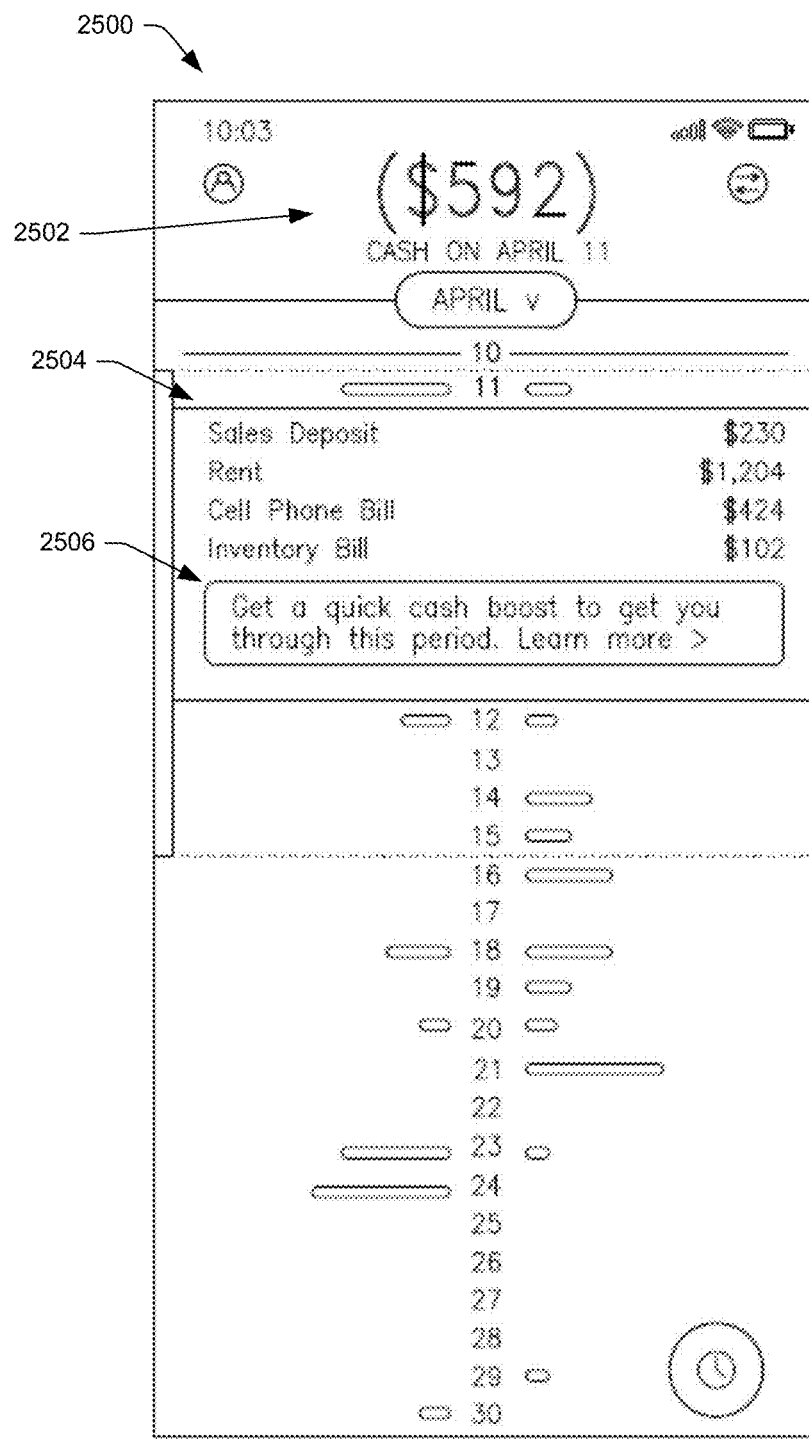
FIG. 25 illustrates an example UI after a user has selected, from the UIs of FIG. 21 or 22, to view details associated with a particular day of the following month. In this example, the account is predicted to have a negative balance on the selected day and, thus, the UI includes an icon that is selectable to request to receive a cash boost.

FIG. 25 illustrates an example UI 2500 after a user has selected, from the UI 2100 or 2200, to view details associated with a particular day of the following month. In this example, the merchant 102(1) or other user has requested to view details associated with a day (April 11) on which the account is predicted to have a negative balance. As illustrated, the UI 2500 includes an area 2502 indicating a predicted balance on the selected day (here, ($592)), as well as an area 2504 showing details associated with the account of the user on the selected day. These details may include, for example, expected income and expenses on the selected day. In this example, the area 2504 indicates that the payment service 108 predicts that the account will receive income corresponding a sales deposit and expenses corresponding to rent, a cell phone bill, and an inventory bill.

Furthermore, given that the account is predicted to have a negative balance (or, potentially, a balance that is less than a specified reserve amount, as described above), the UI 2500 may include an icon 2506 that, when selected, causes one or more actions to be performed for or recommended to a user to avoid the negative balance or to ameliorate effects of this cashflow difficulty. For example, the icon 2506 indicates that the merchant or other user may request a "cash boost" to get through this time period. It is to be appreciated that requesting a "cash boost" may, in some instances, be similar or the same as requesting a "float" as described above with reference to the UI 1100 and in other places herein.

Figure 26:
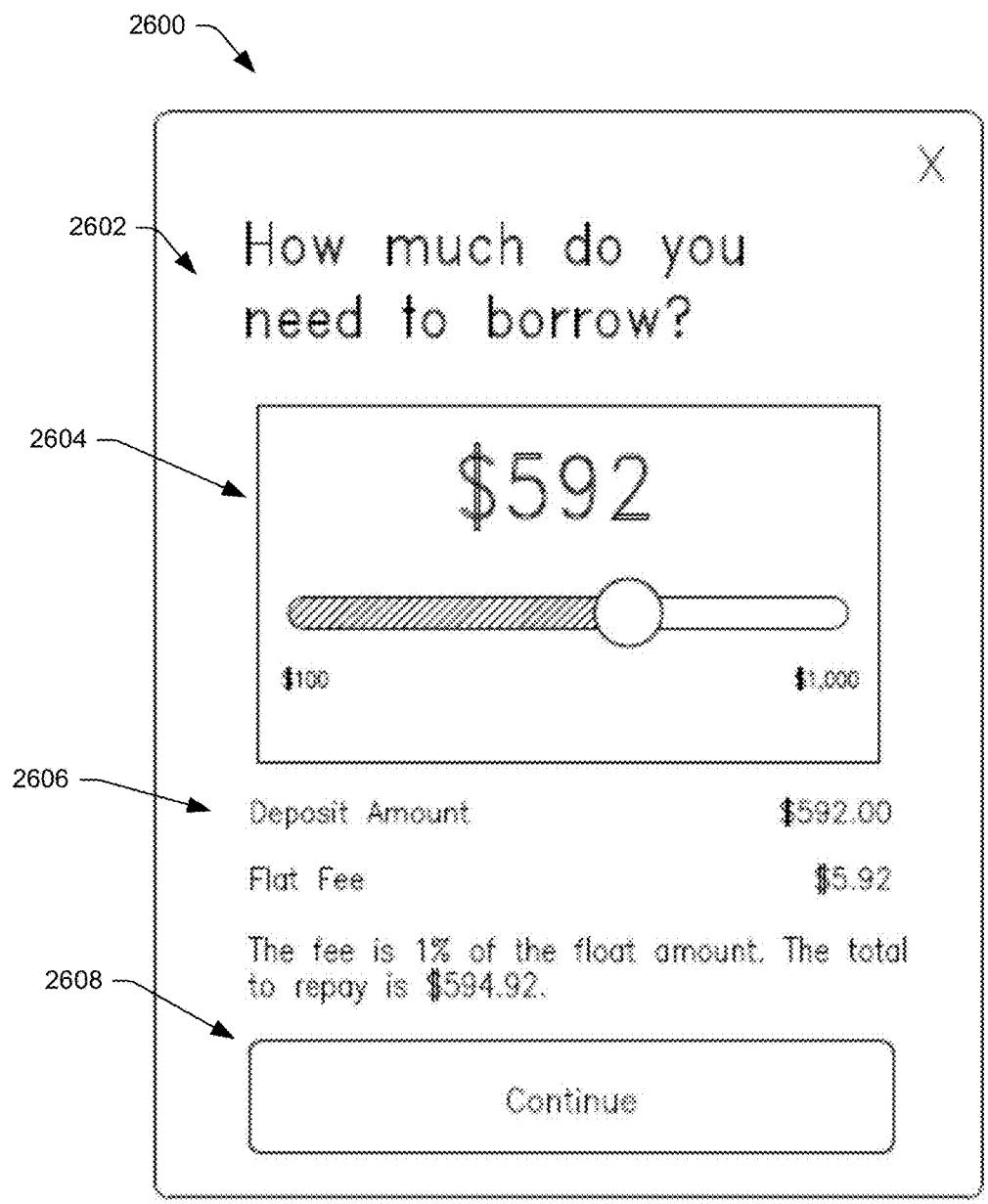
FIG. 26 illustrates an example UI after the user has selected the icon of FIG. 25 to request to receive a cash boost. As illustrated, the UI may enable the user to receive extended capital.

FIG. 26 illustrates an example UI 2600 after the user has selected the icon 2506 to request to receive a cash boost. As illustrated, the UI 2600 may include an area 2602 indicating that the UI 2600 is to enable the user to receive extended capital, as well as a UI element 2604 to enable the merchant or other user to specify the amount of capital to receive. In this example, the UI element 2604 comprises a slider, while in other instances the UI element 2604 may comprise a text box, a drop-down menu, and/or the like. Furthermore, in some instances the UI 2600 may enable the merchant or other user to specify a frequency of the cash boost, an amount of each cash boost, or the like. Further, and as noted above, the amount of cash boost (float) offered to the merchant or other user may be based on specified purpose of the capital.

In addition, the UI 2600 includes an area 2606 indicating terms associated with the offer to extend capital. These terms may indicate, for instance, that the fee for the capital comprises a percentage (e.g., 1%) of the amount of the extended capital. In addition, the area 2606 may indicate repayment terms of the loan. Finally, the UI 2600 may include an icon 2608 that, when selected, initiates a request on behalf of the merchant or other user for the specified amount of capital.

Figure 27:
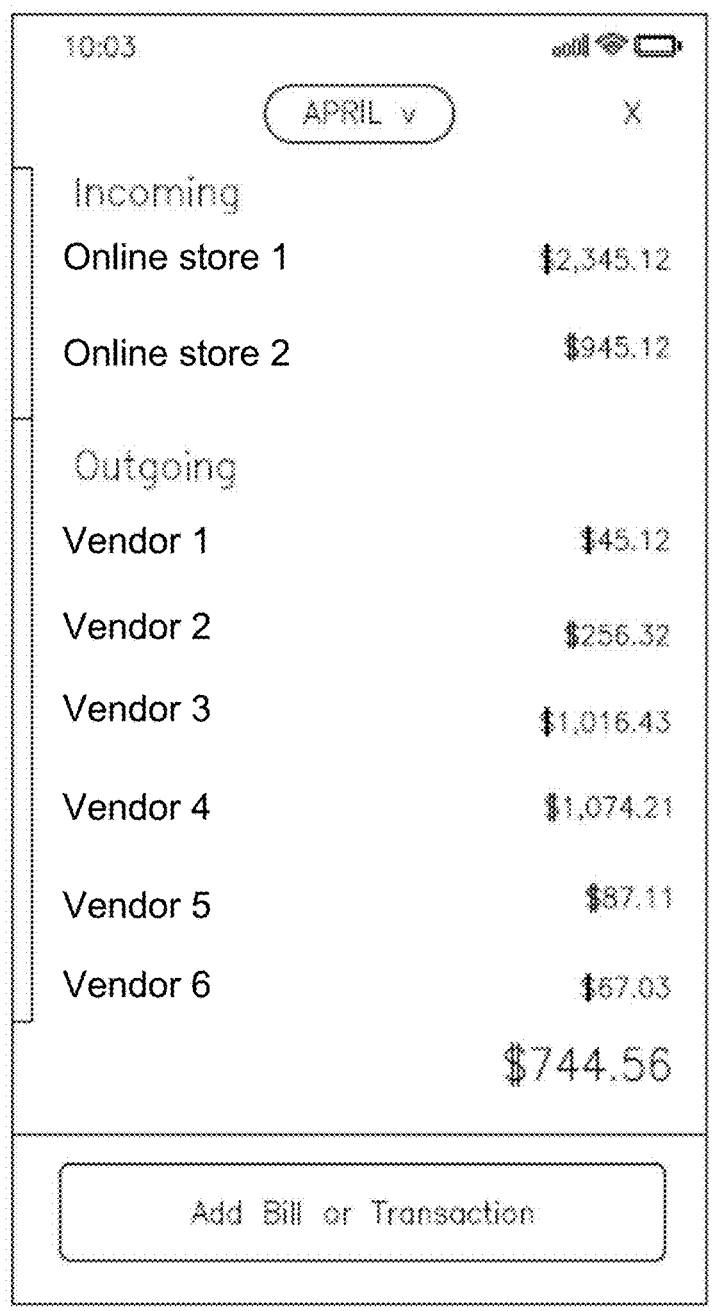
FIG. 27 illustrates an example UI that enables a user to manually enter expenses or income that is not otherwise taken into account in the current account-balance or cash-flow predictions.

Finally, FIG. 27 illustrates an example UI 2700 that enables a user to manually enter expenses or income that is not otherwise taken into account in the current account-balance or cashflow predictions. That is, while the payment service 108 (e.g., via the underlying application) may receive data from tools and/or services of the merchant or other user (e.g., bank account information, etc.), in some instances the merchant or other user may know about expenses or income that is not represented in any of the data available to these tools and/or services. Thus, the UI 2700 may provide functionality to enable the merchant or other user to manually specify known or expected expenses or income. This information may be used by the payment service 108 in unison with data from the tools and/or services for generating the prediction data described above.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various techniques described herein refer to "requests" and/or "prompts." For the purpose of this discussion, a "request" or a "prompt" can be a data item transmitted between computing devices described herein with instructions for performing and/or taking an action (e.g., a "request") and/or a recommendation for performing and/or taking an action (e.g., a "prompt"). In some examples, the "requests" and/or "prompts" can be associated with graphical user interface (GUI) elements that are to be presented via a user interface to communicate the instructions to a user of a respective user device.

Various figures included herein are flowcharts showing example methods involving techniques as described herein. The methods illustrated are described for convenience and ease of understanding. However, the methods illustrated are not limited to being performed using components described in the illustrated figures, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A method implemented by a payment service, comprising:

accessing, from a database of the payment service, historical transaction data indicating payments into a merchant account and payments out of the merchant account over time;

accessing, from the database, historical account-balance information indicating a balance of the merchant account as the balance has varied over time;

determining an exposure value associated with the merchant account, the exposure value based at least in part on a merchant type associated with the merchant account;

generating a predictive model configured to predict minimum balances for merchant accounts to cover payment out of the merchant accounts;

training the predictive model utilizing historical data of at least one other merchant associated with the payment service such that a trained predictive model is generated;

generating, utilizing the trained predictive model and, as input data to the trained predictive model, the historical transaction data, the historical account-balance information, and the exposure value, first data indicating a minimum balance that the merchant account is to maintain to cover future payments out of the merchant account;

generating, using the historical transaction data, second data indicating a time at which balance of the merchant account is predicted to fall below the minimum balance;

determining, using the first data and the second data, that a first amount of time until the time at which the balance of the merchant account is predicted to fall below the minimum balance is less than a second amount of time until a close of a business day associated with the merchant account;

predictively generating, based at least in part on determining that the amount of time is less than the second amount of time, an offer to extend capital to the merchant, wherein the offer to extend capital includes a loan term and an amount of funds to advance to the merchant before the balance of the merchant account falls below the minimum balance; and facilitating, based at least in part on receiving an indication of the merchant accepting the offer, a transfer of the amount of funds from an account of the payment service to the merchant account at or prior to the determined time at which the balance of the merchant account is predicted to fall below the minimum balance.

2. The method as recited in claim 1, further comprising:
determining a time associated with an upcoming event that is predicted to impact the balance of the merchant account;
and wherein generating the second data is based at least in part on the time associated with the upcoming event.

3. The method as recited in claim 1, further comprising:
determining an upcoming event that is predicted to impact the balance of the merchant account;
and wherein generating the first data is further based at least in part on the upcoming event.

4. The method as recited in claim 1, wherein the merchant account comprises a first merchant account associated with a first merchant, and further comprising:
determining a current balance of a second merchant account associated with a second merchant that is different than the first merchant;
generating a minimum balance that second merchant account is to maintain;
determining that a difference between the current balance of the second merchant account and the minimum balance that the second merchant account is to maintain is greater than a threshold; and
transferring an amount of funds that is equal to or less than the difference from the second merchant account to the account of the payment service; and
wherein at least a portion of the amount of funds transferred from the account of the payment service to the first merchant account comprise funds received from the second merchant account.

5. The method as recited in claim 1, wherein the facilitating comprises facilitating the transfer of the amount of funds from the account of the payment service to the merchant account at a first time, and further comprising:
determining a current balance of the merchant account at a second time that is later than the first time;
determining that a difference between the current balance of the merchant account and the minimum balance that the merchant account is to maintain is greater than a threshold; and
facilitating a transfer of a second amount of funds that is equal to or less than the difference from the merchant account to the account of the payment service such that the amount of funds are available for use as loaned funds by one or more other merchant accounts.

6. A system comprising:
one or more databases configured to store historical data associated with an account of a user;
one or more processors; and
one or more computer-executable instructions that, when executed by the one or more processors, cause the one or more processors to perform operations comprising:
determining an exposure value associated with the account, the exposure value based at least in part on a merchant type associated with the account;
generating a predictive model configured to predict minimum balances for user accounts to cover payment out of the user accounts;
training the predictive model utilizing historical data of at least one other user such that a trained predictive model is generated;
generating, utilizing the trained predictive model and, as input data to the trained predictive model, the historical data and the exposure value, a minimum balance that the user is to maintain in the account;
determining, based at least in part on the historical data and the minimum balance, an amount of funds to advance to the user;
generating, based at least in part on the historical data and the minimum balance, timing data indicating a time at which the minimum balance is expected to occur;
determining, based at least in part on the timing data, that a first amount of time until the time at which the minimum balance is expected to occur is less than a second amount of time until a close of business day associated with the merchant account;
generating, based at least in part on determining that the amount of time is less than the second amount of time, an offer to extend capital to the user at or prior to the time, wherein the offer to extend capital specifies a loan term and the amount of funds; and
facilitating, based at least in part on receiving an indication of the user accepting the offer, a transfer of the amount of funds into the account at or prior to the time.

7. The system as recited in claim 6, the operations further comprising:
causing an application executing on a computing device of the user to present a user interface (UI) indicating the offer; and
receiving, from the computing device of the user, the indication of the user accepting the offer.

8. The system as recited in claim 6, the operations further comprising:
receiving an indication of an intended use of the capital; and
receiving, after the facilitating of the transfer of the amount of funds, an indication that at least a portion of the amount of funds has been used spent for the intended use.

9. The system as recited in claim 6, wherein the historical data comprises: (i) historical transaction data indicating payments into and out of the account over time, and (ii) historical account-balance information indicating a balance of the account as the balance has varied over time.

10. The system as recited in claim 6, wherein:
the timing data comprises first timing data;
the time comprises a first time;

49 the operations further comprise generating, prior to determining the amount of funds and the facilitating, second timing data indicating a second time at which a balance of the account would fall below the minimum balance if funds were not transferred into the account; and the generating the first timing data comprises determining the first time at which to transfer the amount of funds into the account such that the balance of the account does not fall below the minimum balance.

11. The system as recited in claim 6, the operations further comprising:

determining, based at least in part on the historical data, a time of year at which an amount of payments at least one of into or out of the account increases;

and wherein the generating the timing data is based at least in part on the time of year.

12. The system as recited in claim 6, the operations further comprising:

determining a date associated with an upcoming event that is occurring with a threshold geographical distance of a location of the user; and determining, based at least in part on the historical data, that the upcoming event is likely to increase an amount of payments at least one of into or out of the account;

and wherein the generating the timing data is based at least in part on the date of the upcoming event.

13. The system as recited in claim 6, wherein:

the account comprises a first account;

the user comprises a first user;

the amount of funds comprises a first amount of funds; and the operations further comprise:

determining a current balance of a second account associated with a second user that is different than the first user;

generating a minimum balance that second account is to maintain; and determining that a difference between the current balance of the second account and the minimum balance that the second account is to maintain is greater than a threshold; and wherein at least a portion of the first amount of funds transferred into the first account comprise funds of the second amount of funds from the second account.

14. The system as recited in claim 6, wherein:

the amount of funds comprises a first amount of funds;

the time comprises a first time; and the operations further comprise:

determining a current balance of the account at a second time that is later than the first time;

determining that a difference between the current balance of the account and the minimum balance that the account is to maintain is greater than a threshold; and facilitating transfer of a second amount of funds that is equal to or less than the difference out of the account such that the second amount of funds are available for use as loaned funds by one or more other accounts.

15. The system as recited in claim 6, wherein:

the amount of funds comprises a first amount of funds;

the time comprises a first time; and the operations further comprise:

determining a current balance of the account at a second time that is later than the first time;

50 determining that a difference between the current balance of the account and the minimum balance that the account is to maintain is greater than a threshold; and facilitating a transfer of a second amount of funds that is equal to or less than the difference from the account into a separate account configured to generate a yield for the user that is greater than a yield associated with the account.

16. The system as recited in claim 6, the operations further comprising:

determining whether funds from the account have been made available as loaned funds for one or more other users during a predefined period of time; and determining one or more repayment terms for at least a portion of the amount of funds loaned to the user based at least in part on whether funds from the account have been made available as loaned funds to one or more other users during the predefined time period.

17. A method comprising:

determining an exposure value associated with an account of a user, the exposure value based at least in part on a user type associated with the account;

generating a predictive model configured to predict minimum balances for user accounts to cover payment out of the user accounts;

training the predictive model utilizing historical data of at least one other user such that a trained predictive model is generated;

generating, utilizing the trained predictive model and historical data associated with the account and the exposure value, first data indicating a minimum balance that the account is to maintain;

determining, based at least in part on the historical data and the minimum balance, an amount of funds to loan to the user;

generating, based at least in part on the historical data and the first data, second data indicating a time at which the minimum balance is expected to occur;

determining, based at least in part on the second data, that a first amount of time until the time at which the minimum balance is expected to occur is less a second amount of time until a close of a business day associated with the merchant account;

generating, based at least in part on determining that the amount of time is less than the second amount of time, an offer to extend capital to the user at or prior to the time, wherein the offer to extend capital specifies a loan term and the amount of funds; and facilitating, based at least in part on receiving an indication of the user accepting the offer, a transfer of the amount of funds into the account at or prior to the time.

18. The method as recited in claim 17, wherein:

the time comprises a first time;

the method further comprises generating, prior to the determining and the facilitating, third data indicating a second time at which a balance of the account would fall below the minimum balance if funds were not transferred into the account; and generating the second data comprises determining the first time at which transfer the amount of funds into the account such that the balance of the account does not fall below the minimum balance.

19. The method as recited in claim 17, further comprising:

determining at least one of: (i) a time of year at which an amount of payments at least one of into or out of the account increase, or (ii) a date of an upcoming event occurring within a threshold geographical distance of the user;

and wherein the generating the second data is based at least in part on the at least one of the time of year or the date of the upcoming event.

20. The method as recited in claim 17, wherein:

the account comprises a first account;

the user comprises a first user;

the amount of funds comprises a first amount of funds; and the method further comprises:

determining a current balance of a second account associated with a second user that is different than the first user;

generating a minimum balance that second user account is to maintain; and determining that a difference between the current balance of the second account and the minimum balance that the second account is to maintain is greater than a threshold;

and wherein at least a portion of the first amount of funds transferred into the first account comprise funds of the second amount of funds from the second account.

* * * * *